(12) United States Patent
Nakano et al.

(10) Patent No.: US 11,242,591 B2
(45) Date of Patent: Feb. 8, 2022

(54) SURFACE-TREATED METAL PLATE, CELL CONTAINER, AND CELL

(71) Applicant: TOYO KOHAN CO., LTD., Tokyo (JP)

(72) Inventors: Yuji Nakano, Kudamatsu (JP); Daisuke Matsushige, Kudamatsu (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 16/498,741

(22) PCT Filed: Mar. 30, 2018

(86) PCT No.: PCT/JP2018/013756
§ 371 (c)(1),
(2) Date: Sep. 27, 2019

(87) PCT Pub. No.: WO2018/181950
PCT Pub. Date: Oct. 4, 2018

(65) Prior Publication Data
US 2020/0035960 A1  Jan. 30, 2020

(30) Foreign Application Priority Data
Mar. 31, 2017 (JP) .............................. JP2017-072626

(51) Int. Cl.
*H01M 50/138* (2021.01)
*C23C 8/16* (2006.01)
(Continued)

(52) U.S. Cl.
CPC ................ *C23C 8/16* (2013.01); *C25D 5/14* (2013.01); *C25D 5/50* (2013.01); *C25D 5/617* (2020.08); *H01M 50/138* (2021.01)

(58) Field of Classification Search
CPC .......... H01M 50/138; C23C 8/16; C25D 5/12; C25D 5/50
(Continued)

(56) References Cited

U.S. PATENT DOCUMENTS

2013/0209864 A1    8/2013  Kuniya
2014/0050971 A1*   2/2014  Tomomori ............... C25D 5/50
                                                          429/176
2019/0381765 A1*  12/2019  Saito ....................... C22C 38/02

FOREIGN PATENT DOCUMENTS

| JP | 2000-212728 A | 8/2000 |
| JP | 2012-048958 A | 3/2012 |
| WO | 2012/147843 A1 | 11/2012 |

OTHER PUBLICATIONS

Takasu, Yoshio et al., "Preferential Oxidation Characteristics in the Oxidation of Cobalt-Nickel Alloys in Nitric Oxide and in Oxygen", The Journal of Physical Chemistry, 1977, pp. 1407-1410, vol. 81, No. 14.

(Continued)

Primary Examiner — Humera N. Sheikh
Assistant Examiner — Katherine A Christy
(74) Attorney, Agent, or Firm — Sughrue Mion, PLLC

(57) ABSTRACT

A surface-treated metal plate including: a metal plate; and a nickel-cobalt binary alloy layer formed on the metal plate. When a part having a content ratio of oxygen atoms of 5 atomic % or more as measured by X-ray photoelectron spectroscopic analysis is an oxide coating film, the nickel-cobalt binary alloy layer contains the oxide coating film with a thickness of 0.5 to 30 nm on a surface thereof, and when a pressure cooker test including temperature increasing, retention for 72 hours under a water-vapor atmosphere at a temperature of 105° C. and a relative humidity of 100% RH, (Continued)

and temperature decreasing is performed, the amount of increase in the thickness of the oxide coating film is 28 nm or less.

13 Claims, 19 Drawing Sheets

(51) Int. Cl.
    *C25D 5/50*     (2006.01)
    *C25D 5/00*     (2006.01)
    *C25D 5/14*     (2006.01)

(58) Field of Classification Search
    USPC .......................................................... 428/632
    See application file for complete search history.

(56) References Cited

OTHER PUBLICATIONS

Wang, Liping, et al., "Fabrication of a nanocrystalline Ni—Co/CoO functionally graded layer with excellent electrochemical corrosion and tribological performance", Nanotechnology, Sep. 2006, pp. 4614-4623, vol. 17, No. 17.

International Search Report of PCT/JP2018/013756 dated Jun. 26, 2018 [PCT/ISA/210].

* cited by examiner

AMOUNT OF CHANGE IN COLOR TONE [ΔL*] AND
COLOR TONE EVALUATION

|  |  | HEAT TREATMENT TEMPERATURE [°C] | | | | | | | |
|---|---|---|---|---|---|---|---|---|---|
|  |  | NONE | | 300 | | 500 | | 700 | |
| AMOUNT OF Co [g/m²] | 0.36~0.38 | −2.82 | − | −2.02 | − | −1.61 | − | −2.2 | − |
|  | 0.63~0.67 | −3.93 | 3 | −2.64 | 3 | −1.62 | 1 | −1.41 | 1 |
|  | 0.73~0.79 | −4.29 | 3 | −2.85 | 3 | −1.71 | 1 | −1.72 | 1 |
|  | 0.85~0.9 | −3.7 | 3 | −2.78 | 3 | −2.15 | 2 | −1.59 | 1 |
|  | 1.16~1.22 | −8.14 | 4 | −4.83 | 3 | −2 | 2 | −1.81 | 1 |
|  | 1.33~1.38 | −11.4 | 4 | −8.5 | 4 | −3.06 | 3 | −1.36 | 1 |
|  | 1.49~1.54 | −15.85 | 4 | −10.94 | 4 | −3.07 | 3 | −1.42 | 1 |
|  | 1.84~1.88 | −31.16 | 5 | −32.26 | 5 | −17.39 | 4 | −2.44 | NG |

Figure 11

SURFACE-TREATED METAL PLATE, CELL CONTAINER, AND CELL

CROSS REFERENCE TO RELATED APPLICATIONS

This application is a National Stage of International Application No. PCT/JP2018/013756, filed Mar. 30, 2018, claiming priority to Japanese Patent Application No. 2017-072626, filed Mar. 31, 2017.

TECHNICAL FIELD

The present invention relates to a surface-treated metal plate, a battery case using such a surface-treated metal plate, and a battery using such a battery case.

BACKGROUND ART

In recent years, portable devices such as audio devices and mobile phones have been used in a wide variety of fields, and as power sources therefor, primary batteries such as alkaline batteries, and secondary batteries such as nickel hydride batteries and lithium-ion batteries have frequently been used. These batteries are required to have enhanced performance such as higher output and longer service life, and battery cases, in which electricity generation elements consisting of positive electrode active materials, negative electrode active materials, and the like are accommodated, are also required to be improved in their performance as important components of batteries.

For example, Patent Document 1 discloses a surface-treated metal plate in which a particular nickel-cobalt alloy layer is formed on the outermost surface of the surface thereof, which is to be the inner surface of a battery case, from the viewpoint of improving battery characteristics when such a surface-treated metal plate is used for battery cases.

RELATED ART

Patent Document

Patent Document 1: International Publication No. WO 2012/147843

SUMMARY OF THE INVENTION

Problem to be Solved by the Invention

However, according to the above-described technique of Patent Document 1, although the produced surface-treated metal plate does not exhibit discoloration on its surface in the state immediately after the production, the following problem occurs: the surface may be discolored if the surface-treated metal plate is stored as is for a long period of time such as a half year or one year before being used for battery cases or if the surface-treated metal plate is exposed to an environment with high temperature and high humidity. In particular, when the above-described surface-treated metal plate according to Patent Document 1 is formed into a long product (for example, a product produced by forming a nickel-cobalt alloy layer continuously on a steel strip), the following problem occurs: if it is stored for a long period of time in a wound state like a coil, humidity rises at gaps between the surface-treated metal plates and discoloration of the surface-treated metal plate tends to proceed readily.

An object of the present invention is to provide a surface-treated metal plate that can prevent discoloration of the surface thereof even if it is stored for a long period of time, and that can also improve battery characteristics when it is used for battery cases. In addition, another object of the present invention is to provide a battery case and a battery that are obtained by using such a surface-treated metal plate.

Means for Solving the Problem

As a result of diligent researches by the present inventors in order to achieve the above-described objects, it has been found that the above-described objects can be achieved by forming a nickel-cobalt binary alloy layer comprising a particular oxide coating film on a metal plate, thereby leading to completion of the present invention.

That is, according to the present invention, provided is a surface-treated metal plate comprising: a metal plate; and a nickel-cobalt binary alloy layer formed on the metal plate, wherein when a part having a content ratio of oxygen atoms of 5 atomic % or more as measured by X-ray photoelectron spectroscopic analysis is an oxide coating film, the nickel-cobalt binary alloy layer comprises the oxide coating film with a thickness of 0.5 to 30 nm on a surface thereof, and when a pressure cooker test comprising temperature increasing, retention for 72 hours under a water-vapor atmosphere at a temperature of 105° C. and a relative humidity of 100% RH, and temperature decreasing is performed, the amount of increase in the thickness of the oxide coating film is 28 nm or less.

In the surface-treated metal plate according to the present invention, when a measurement by X-ray photoelectron spectroscopic analysis is carried out on the surface on which the nickel-cobalt binary alloy layer comprising the oxide coating film is formed, the upper limit of a ratio of the number of cobalt atoms to the number of nickel atoms at an etching depth where a content ratio of oxygen atoms is 5 atomic % ($Co/Ni_{(5\ atomic\ \%\ of\ oxygen)}$) is preferably 1.9 or less, more preferably 1.6 or less, further preferably 1.3 or less, and particularly preferably 1.0 or less from the viewpoint of being capable of suppressing discoloration more stably. In addition, the lower limit thereof is preferably 0.2 or more, more preferably 0.3 or more, and further preferably 0.4 or more from the viewpoint of being capable of suppressing increase in contact resistance more.

In the surface-treated metal plate according to the present invention, when a crystal grain size is measured by electron backscatter diffraction on an outermost surface of the surface on which the nickel-cobalt binary alloy layer comprising the oxide coating film is formed, it should be preferred that a ratio, by number, of crystal grains having a crystal grain size of 0.95 μm or more to crystal grains having a crystal grain size of 0.05 μm or more (GS1) be 19% or more.

Alternatively, in the surface-treated metal plate according to the present invention, when a crystal grain size is measured by electron backscatter diffraction on an outermost surface of the surface on which the nickel-cobalt binary alloy layer comprising the oxide coating film is formed, it should be preferred that a ratio, by number, of crystal grains having a crystal grain size of 0.95 μm or more to crystal grains having a crystal grain size of 0.05 μm or more (GS1) be less than 19%, and that a ratio, by number, of crystal grains having a crystal grain size of 0.05 μm or more and less than 0.25 μm to crystal grains having a crystal grain size of 0.05 μm or more and less than 1.05 μm (GS2) be 56% or less.

In the surface-treated metal plate according to the present invention, when a measurement by X-ray photoelectron spectroscopic analysis is carried out at the surface on which the nickel-cobalt binary alloy layer comprising the oxide coating film is formed, it should be preferred that a ratio of the number of cobalt atoms to the number of nickel atoms at a depth of 8.9 nm (a value in terms of $SiO_2$) ($Co/Ni_{(8.9)}$) be 0.4 to 1.4.

In the surface-treated metal plate according to the present invention, when a measurement by X-ray photoelectron spectroscopic analysis is carried out on the surface on which the nickel-cobalt binary alloy layer comprising the oxide coating film is formed, it should be preferred that a ratio of the number of cobalt atoms to the number of nickel atoms at a depth of 40 nm (a value in terms of $SiO_2$) ($Co/Ni_{(40)}$) be 0.5 to 3.2.

In the surface-treated metal plate according to the present invention, when a pressure cooker test comprising temperature increasing, retention for 72 hours under a water-vapor atmosphere at a temperature of 105° C. and a relative humidity of 100% RH, and temperature decreasing is carried out, it should be preferred that the thickness of the oxide coating film after the pressure cooker test be 35 nm or less.

In the surface-treated metal plate according to the present invention, the upper limit of the amount of cobalt contained in the nickel-cobalt binary alloy layer comprising the oxide coating film is preferably 6.0 $g/m^2$ or less, more preferably 3.5 $g/m^2$ or less, further preferably 2.6 $g/m^2$ or less, and particularly preferably 1.8 $g/m^2$ or less from the viewpoint of being capable of suppressing discoloration more stably. In addition, the lower limit thereof is preferably 0.15 $g/m^2$ or more, more preferably 0.3 $g/m^2$ or more, and further preferably 0.35 $g/m^2$ or more from the viewpoint of being capable of suppressing increase in contact resistance more.

In the surface-treated metal plate according to the present invention, it should be preferred that the surface-treated metal plate further comprise a nickel plating layer as an undercoating of the nickel-cobalt binary alloy layer.

In the surface-treated metal plate according to the present invention, the upper limit of the total amount of nickel contained in the nickel-cobalt binary alloy layer comprising the oxide coating film and the nickel plating layer is preferably 28.5 $g/m^2$ or less, more preferably 19.5 $g/m^2$ or less, and further preferably 15.0 $g/m^2$ or less from the viewpoint of allowing excellent electric resistance and excellent corrosion resistance. The lower limit thereof is preferably 2.9 $g/m^2$ or more and more preferably 4.7 $g/m^2$ or more from the viewpoint of retaining corrosion resistance for iron, which is the substrate.

According to the present invention, provided is a battery case comprising any of the above-described surface-treated metal plates.

In addition, according to the present invention, provided is a battery comprising the above-described battery case.

Effects of Invention

According to the present invention, a surface-treated metal plate that can prevent discoloration of the surface thereof even if it is stored for a long period of time, and that can also improve battery characteristics when it is used for battery cases can be provided. In addition, the present invention can also provide a battery case and a battery that are obtained by using such a surface-treated metal plate.

BRIEF DESCRIPTION OF DRAWINGS

FIG. 11 is a table showing results of color tone evaluation for surface-treated metal plates with varied amounts of Co contained in a nickel-cobalt binary alloy layer and an oxide coating film;

DESCRIPTION OF EMBODIMENTS

Hereinafter, one embodiment according to the present invention will be described with reference to the accompanying drawings. A surface-treated metal plate according to the present invention is processed to an outer shape corresponding to a desired shape of a battery. The battery is not particularly limited, and examples thereof include primary batteries such as alkaline batteries, and secondary batteries such as nickel hydride batteries, lithium-ion batteries, and the like, and the surface-treated metal plate according to the present invention can be used as a member of a battery case for these batteries. Hereinafter, the present invention will be described through an embodiment in which the surface-treated metal plate according to the present invention is used for a positive electrode can constituting a battery case of alkaline batteries.

Figure 1:
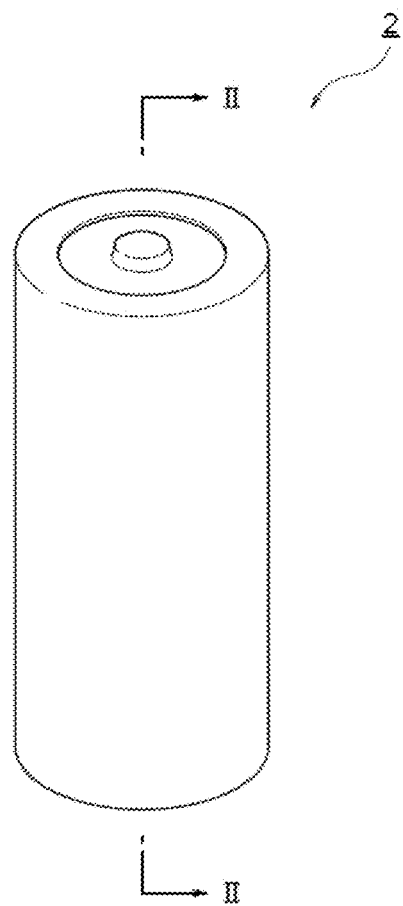
FIG. 1 is a perspective view showing one embodiment of a battery to which a surface-treated metal plate according to the present invention is applied.
Figure 2:
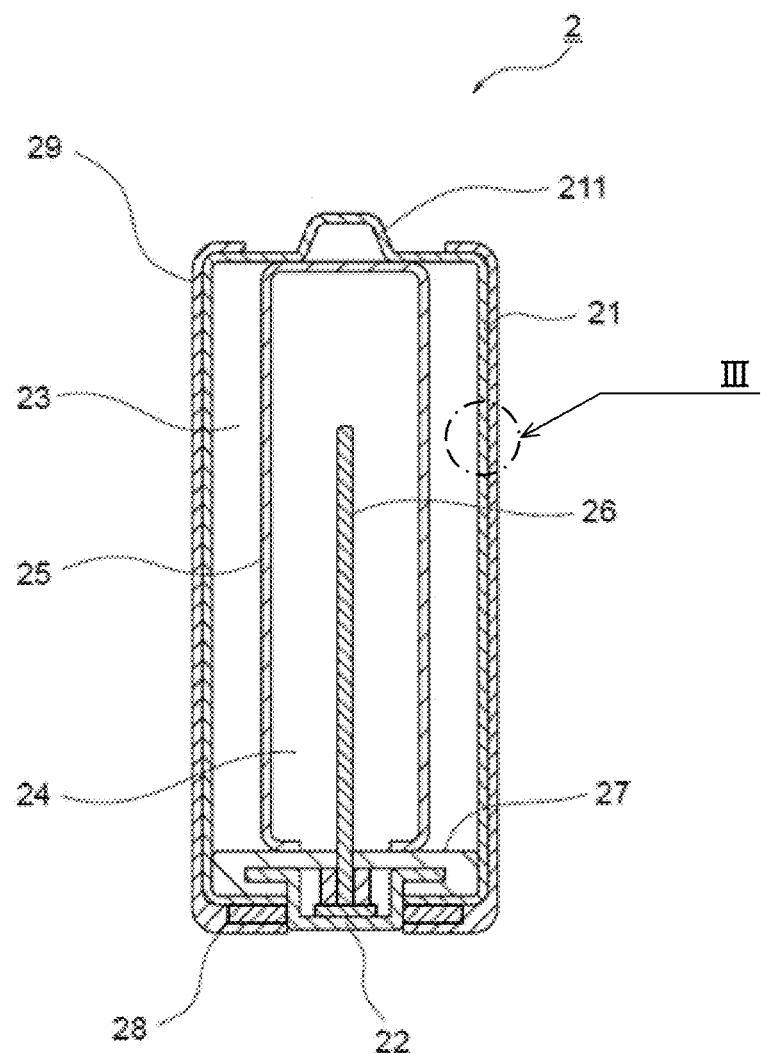
FIG. 2 is a cross-sectional view along with line II-II in FIG. 1.

FIG. 1 is a perspective view showing one embodiment of alkaline battery 2 to which a surface-treated metal plate according to the present invention is applied, and FIG. 2 is a cross-sectional view along with line II-II in FIG. 1. In alkaline battery 2 of this example, positive electrode mix 23 and negative electrode mix 24 are accommodated inside positive electrode can 21 with a bottomed cylindrical shape, having separator 25 therebetween, and at the inner surface side of the opening of positive electrode can 21, a sealing body composed of negative electrode terminal 22, collector 26 and gasket 27 is caulked. Note that convex, positive electrode terminal 211 is formed at the bottom center of positive electrode can 21. In addition, outer packaging 29 is fitted to positive electrode can 21 with insulation ring 28 therebetween in order to impart insulating properties, improve design properties, etc.

Positive electrode can 21 of alkaline battery 2 shown in FIG. 1 is obtained by subjecting the surface-treated metal plate according to the present invention to forming via deep drawing method, drawing and ironing method (DI method), drawing and thin redrawing (DTR method), a processing method in which stretch-forming and ironing are used in combination after drawing, or the like. Hereinafter, the configuration of a surface-treated metal plate according to the present invention (surface-treated metal plate 1) will be described with reference to FIG. 3.

Figure 3:
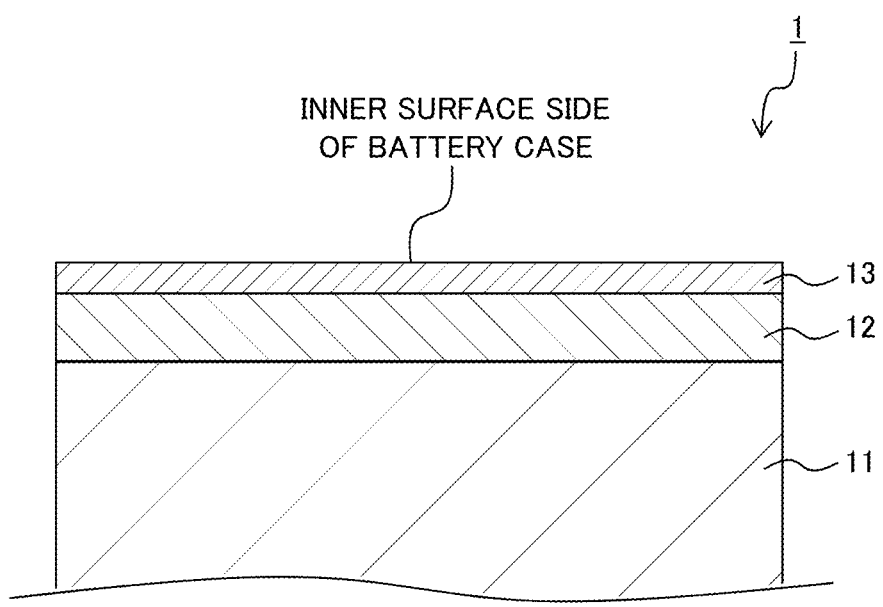
FIG. 3 is a cross-sectional view showing one embodiment of a surface-treated metal plate according to the present invention.

FIG. 3 is a cross-sectional view showing surface-treated metal plate 1 according to the present embodiment, and it is used for constituting positive electrode can 21 including part III of positive electrode can 21 shown in FIG. 2. In FIG. 3, the upper side corresponds to the inner surface side of alkaline battery 2 (the surface that is in contact with positive electrode mix 23 of alkaline battery 2) of FIG. 1. Surface-treated metal plate 1 according to the present embodiment is configured such that nickel-cobalt binary alloy layer 12 comprising oxide coating film 13 is formed on a steel plate constituting metal plate 11 of surface-treated metal plate 1, as shown in FIG. 3.

Surface-treated metal plate 1 according to the present embodiment comprises metal plate 11 and nickel-cobalt binary alloy layer 12 formed on the metal plate 11, wherein when a part having a content ratio of oxygen atoms of 5 atomic % or more as measured by X-ray photoelectron spectroscopic analysis is oxide coating film 13, the nickel-cobalt binary alloy layer comprises the oxide coating film with a thickness of 0.5 to 30 nm on a surface thereof, and when a pressure cooker test comprising temperature increasing, retention for 72 hours under a water-vapor atmosphere at a temperature of 105° C. and a relative humidity of 100% RH, and temperature decreasing is carried out, the amount of increase in the thickness of the oxide coating film is 28 nm or less after the pressure cooker test. As such, surface-treated metal plate 1 according to the present embodiment can prevent discoloration of the surface thereof even if it is stored for a long period of time, and can provide a surface-treated metal plate that can also improve battery characteristics when it is used for battery cases.

<Metal Plate 11>

For metal plate 11, there is no particular limitation, but steel, stainless steel, Al, Al alloys, Ti, Ti alloys, Cu, Cu alloys, Ni, Ni alloys and the like can be used from the viewpoint of excellent processability, and among these, steel and stainless steel are preferable, and low-carbon aluminum killed steel (carbon content of 0.01 to 0.15% by weight), ultra low carbon steel with a carbon content of 0.003% by weight or less, non-aging ultra low carbon steel formed by adding Ti, Nb or the like to ultra low carbon steel, or the like are particularly preferable. Note that, although an example in which a steel plate is used as metal plate 11 is presented in the surface-treated metal plate illustrated in FIG. 3, metal plate 11 is not limited to the steel plate.

The thickness of metal plate 11 is not particularly limited as long as it is appropriately selected depending on an application of the surface-treated metal plate, but it is preferably 0.015 to 1.5 mm. For steel plates (carbon steel or stainless) for batteries such as alkaline batteries and coin batteries, the thickness is preferably 0.15 to 0.6 mm, and particularly for steel plates for alkaline battery cans, it is preferably 0.15 to 0.5 mm. On the other hand, for applications where weight reduction or flexibility is required, the metal plate is preferably in the shape of foil having a thickness of 0.015 mm to 0.1 mm.

<Nickel-Cobalt Binary Alloy Layer 12>

Surface-treated metal plate 1 according to the present embodiment comprises nickel-cobalt binary alloy layer 12 on metal plate 11. Note that nickel-cobalt binary alloy layer 12 comprises oxide coating film 13 on the surface thereof, as mentioned later. In the present embodiment, a method of forming nickel-cobalt binary alloy layer 12 is not particularly limited, and mention may be made of, for example, the following method. That is, as the first method, mention may be made of a method in which plating is carried out on the surface of metal plate 11 using a nickel-cobalt alloy plating bath, and heat treatment is then performed as necessary to obtain nickel-cobalt binary alloy layer 12. Alternatively, as the second method, mention may be made of a method in which a nickel plating layer and a cobalt plating layer are formed on the surface of metal plate 11 in this order, and heat treatment is then performed thereon for thermal diffusion. However, in the present embodiment, the method of forming nickel-cobalt binary alloy layer 12 is not particularly limited to the above-described methods.

Note that nickel-cobalt binary alloy layer 12 can be an alloy layer substantially consisting of nickel and cobalt, and it can be, for example, an alloy layer in which the content of metals other than nickel and cobalt is suppressed to be preferably 1% by weight or less and more preferably 0.5% by weight or less. In addition, at least a part of nickel and/or cobalt may be oxidized due to the heat treatment, and furthermore, it may contain inevitable components other than metals, such as carbon, in an amount of, for example, about 1% by weight or less.

When nickel-cobalt binary alloy layer 12 is formed by the above-described first method, the nickel-cobalt alloy plating is preferably carried out using a plating bath based on a Watts bath containing nickel sulfate, nickel chloride, cobalt sulfate and boric acid as the nickel-cobalt alloy plating bath. Note that the cobalt/nickel ratio in the plating bath is preferably in the range of 0.1 to 1.0, more preferably in the range of 0.18 to 0.69, and further preferably 0.2 to 0.6 in the molar ratio of cobalt/nickel. For example, when the plating bath based on a Watts bath containing nickel sulfate, nickel chloride, cobalt sulfate and boric acid is used, a plating bath can be used in which components are appropriately adjusted in respective ranges of nickel sulfate: 10 to 300 g/L, nickel chloride: 20 to 60 g/L, cobalt sulfate: 10 to 250 g/L and boric acid: 10 to 40 g/L such that the cobalt/nickel ratio falls within the above-described range. In addition, the nickel-cobalt alloy plating is preferably carried out under conditions of bath temperature: 40 to 80° C., pH: 1.5 to 5.0 and current density: 1 to 40 A/dm$^2$, and more preferably 10 to 30 A/dm$^2$ from the viewpoint of controlling the grain size of the nickel-cobalt binary alloy layer. The plating thickness is preferably 0.05 to 1.0 μm, and from the viewpoint of suppression of discoloration and corrosion resistance, and effects of improving battery characteristics when the surface-treated metal plate is used for alkaline battery cans, the lower limit thereof is more preferably 0.08 µm and further preferably 0.1 µm when a nickel layer is formed as an undercoating, as mentioned later, and it is preferably 0.3 µm or more when a nickel layer is not formed as an undercoating. When the plating is too thick, it becomes hard to obtain effects of suppressing discoloration, the upper limit of the plating thickness is more preferably 0.5 µm and further preferably 0.3 µm when a nickel layer is formed as an undercoating.

When the above-mentioned nickel-cobalt alloy plating bath is used, it is preferable to carry out plating while stirring the nickel-cobalt alloy plating bath. By carrying out stirring, the amount of cobalt in nickel-cobalt binary alloy layer 12 to be formed can be stabilized. That is, alloy plating of nickel and cobalt is, considering the standard electrode potentials thereof, considered to be a eutectoid in which cobalt is preferentially deposited. On the other hand, when a plating bath having a cobalt/nickel ratio in the range as mentioned above is used, when a plating layer is formed, nickel tends to be deposited more readily compared to cobalt in spite of the amount of change in the plating bath. When plating is carried out without stirring of the nickel-cobalt alloy plating bath, the above-described tendency is enhanced more, and in such a situation, it may become hard to control the respective content ratios of nickel and cobalt in nickel-cobalt binary alloy layer 12 to be formed within desired ranges. In contrast, by carrying out the plating while stirring the nickel-cobalt alloy plating bath, it becomes possible to control the content ratios of nickel and cobalt in nickel-cobalt binary alloy layer 12 to be formed more readily depending on the molar ratio of cobalt/nickel in the nickel-cobalt alloy plating bath, and it becomes possible to form nickel-cobalt binary alloy layer 12 in which the content ratios of nickel and cobalt are controlled to be within desired ranges.

A method of stirring the nickel-cobalt alloy plating bath is not particularly limited, and examples thereof include a method in which bubbling jet is provided to the nickel-cobalt alloy plating bath while carrying out the plating, and the like.

In addition, from the viewpoint of suppressing fluctuation of metal ion concentrations (nickel ion concentration and cobalt ion concentration) in the nickel-cobalt alloy plating bath while carrying out the plating, it is preferable to use a nickel electrode and a cobalt electrode as the anode and use them as supply sources of nickel ions and cobalt ions. Upon this, for the anode, a method in which those formed by mixing a nickel pellet and a cobalt pellet and filling the mixture into an anode basket are used, or a method in which an alloy pellet of nickel and cobalt is used may be employed. However, from the viewpoint of being capable of suppressing metal ion concentrations in the nickel-cobalt alloy plating bath more properly, the method in which those formed by mixing a nickel pellet and a cobalt pellet and filling the mixture into an anode basket are used is preferable.

In the nickel-cobalt alloy plating, the cobalt/nickel ratio in the nickel-cobalt alloy layer to be formed is susceptible to change in the cobalt/nickel ratio in the plating bath, and this is prominent especially when metal plate 11 is a steel strip because the nickel-cobalt alloy layer is formed through continuous plating. The cobalt/nickel ratio in the nickel-cobalt binary alloy layer to be formed greatly affects suppression of discoloration, and thus, it is important to control this ratio. In the present embodiment, by carrying out the stirring as mentioned above or using a nickel electrode and a cobalt electrode as the anode, nickel-cobalt binary alloy layer 12 in which content ratios are controlled to be desired values can be formed stably.

In addition, the current density upon carrying out the nickel-cobalt alloy plating is preferably in the above-described range. For the current density upon the plating, if it is too high, there is a risk that crystal grains become too fine, but if it is in the range with consideration of suppressing burnt plating or the like, the current density is considered not to greatly affect actions of suppressing discoloration of surface-treated metal plate 1. Note that, if the current density is too small, the grain size becomes large. For example, in an application as battery cans or the like, there is a risk that seizuring to a metal mold occurs upon forming.

Figure 4:
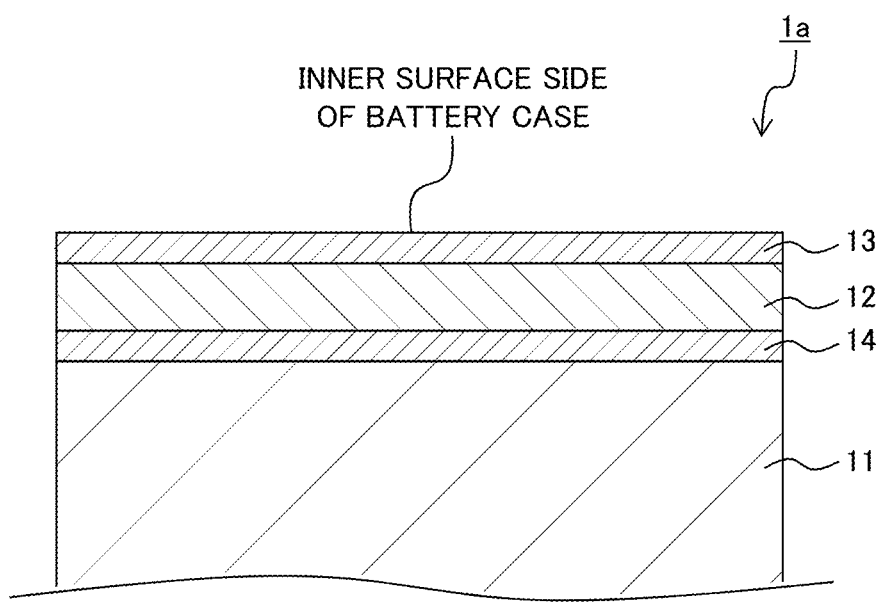
FIG. 4 is a cross-sectional view showing the second embodiment of a surface-treated metal plate according to the present invention.

In addition, in the first method, it is preferable to perform undercoating nickel plating before forming nickel-cobalt binary alloy layer 12 to form an undercoating nickel plating layer. The undercoating nickel plating layer can be formed by using a commonly used Watts bath, and the thickness thereof is preferably in the range of 0.02 to 3.0 µm. The upper limit of the thickness is more preferably 2.0 µm or less and further preferably 1.5 µm or less, and the lower limit thereof is more preferably 0.5 µm or more. In the first method, by forming the undercoating nickel plating layer, as shown in FIG. 4, surface-treated metal plate 1a can have nickel layer 14 and nickel-cobalt binary alloy layer 12 in this order from the bottom on metal plate 11 (Ni—Co/Ni/Fe).

In the present embodiment, even if surface-treated metal plate 1 to be obtained is stored for a long period of time, by forming the undercoating nickel plating layer (nickel layer 14), it is possible to more effectively prevent oxide coating film 13 from further being oxidized excessively during the storage. Due to this, discoloration of the surface of surface-treated metal plate 1 can be prevented more effectively, and furthermore, battery characteristics can be improved when surface-treated metal plate 1 is used for battery cases. Note that the undercoating nickel plating layer (nickel layer 14) may contain cobalt as long as it does not hinder effects of the present invention, that is, as long as discoloration of the surface of surface-treated metal plate 1 can be prevented effectively.

In addition, in the present embodiment, it is preferable to perform heat treatment after carrying out the plating on the surface of metal plate 11 by using the nickel-cobalt alloy plating bath. The heat treatment in this case may be carried out by any of continuous annealing method or box annealing method.

Conditions for the heat treatment are preferably the following conditions from the viewpoint of being capable of more satisfactorily forming oxide coating film 13, which will be mentioned later. First of all, when the heat treatment is carried out by continuous annealing, the heat treatment temperature is preferably 450 to 900° C., more preferably 500 to 800° C., and further preferably 520 to 750° C., and the heat treatment time is preferably 3 to 120 seconds, more preferably 10 to 90 seconds, and further preferably 20 to 60 seconds. Alternatively, when the heat treatment is carried out by box annealing, the heat treatment temperature is preferably 400 to 700° C., more preferably 450 to 650° C., and further preferably 450 to 600° C., the heat treatment time is preferably 30 minutes to 12 hours, more preferably 30 minutes to 10 hours, and further preferably 60 minutes to 8 hours, and the heat treatment atmosphere is preferably a non-oxidizing atmosphere or a reducing protective gas atmosphere. Note that, when the heat treatment atmosphere is a reducing protective gas atmosphere, it is preferable to use a protective gas with good heat transfer consisting of 75% hydrogen-25% nitrogen produced by ammonia crack method, which is referred to as hydrogen-enriched annealing.

Figure 5:
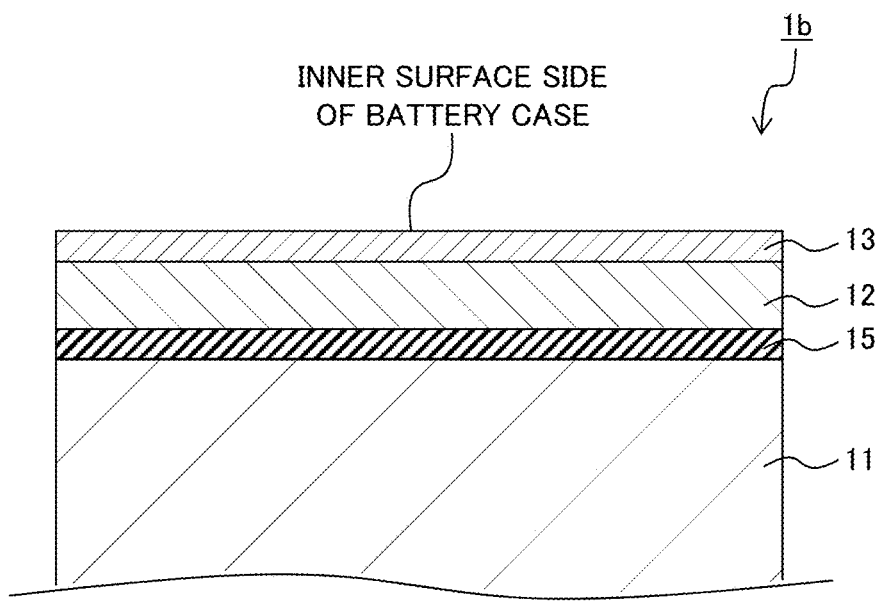
FIG. 5 is a cross-sectional view showing the third embodiment of a surface-treated metal plate according to the present invention.
Figure 6:
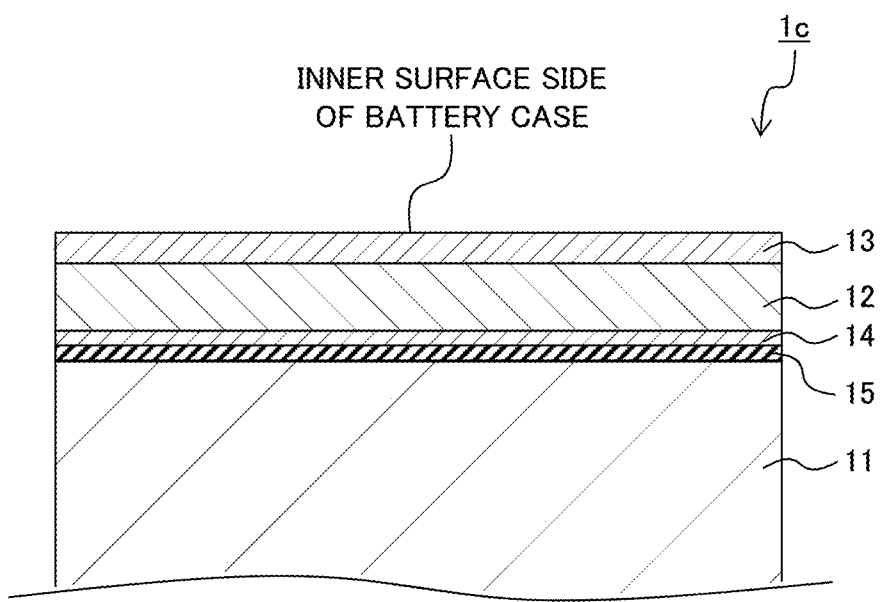
FIG. 6 is a cross-sectional view showing the fourth embodiment of a surface-treated metal plate according to the present invention.

By carrying out the above-mentioned treatment for thermal diffusion, oxide coating film 13, which will be mentioned later, can be satisfactorily formed on the surface of nickel-cobalt binary alloy layer 12. Moreover, by carrying out the treatment for thermal diffusion, when metal plate 11 is a steel plate, it is also possible to form an iron-nickel diffusion layer and/or an iron-nickel-cobalt diffusion layer between metal plate 11 and nickel-cobalt binary alloy layer 12. Accordingly, the configuration of the surface-treated metal plate according to the present embodiment can have an iron-nickel diffusion layer and/or an iron-nickel-cobalt diffusion layer, and nickel-cobalt binary alloy layer 12 in this order from the bottom on metal plate 11 (Ni—Co/Fe—Ni and/or Ni—Co—Fe/Fe). Alternatively, when an undercoating nickel plating layer is foiled, depending on the thickness of the undercoating nickel plating layer or heat treatment conditions, the configuration may have iron-nickel diffusion layer 15 and nickel-cobalt binary alloy layer 12 in this order from the bottom on metal plate 11 (Ni—Co/Fe—Ni/Fe) as in surface-treated metal plate 1b shown in FIG. 5, or the configuration may have iron-nickel diffusion layer 15, nickel layer 14 and nickel-cobalt binary alloy layer 12 in this order from the bottom on metal plate 11 (Ni—Co/Ni/Fe—Ni/Fe) as in surface-treated metal plate 1c shown in FIG. 6.

On the other hand, when nickel-cobalt binary alloy layer 12 is formed by the above-described second method, first of all, a nickel plating layer is formed on the surface of metal plate 11 by using a nickel plating bath. For the nickel plating bath, a plating bath commonly used for nickel plating, that is, a Watts bath, a sulfamate bath, a borofluoride bath, a chloride bath or the like can be used. For example, the nickel plating layer can be formed by using a Watts bath having a bath composition of nickel sulfate: 200 to 350 g/L, nickel chloride: 20 to 60 g/L and boric acid: 10 to 50 g/L under conditions of pH: 1.5 to 5.0, bath temperature: 40 to 80° C. and current density: 1 to 40 A/dm². The thickness of the nickel plating layer is preferably 0.2 to 3.0 μm and more preferably 0.5 to 2.0 μm.

Next, by performing cobalt plating on metal plate 11 having the nickel plating layer formed thereon, a cobalt plating layer is formed on the nickel plating layer. For example, the cobalt plating layer can be formed by using a cobalt plating bath having a bath composition of cobalt sulfate: 200 to 300 g/L, cobalt chloride: 50 to 150 g/L and sodium chloride: 10 to 50 g/L under conditions of pH: 2 to 5, bath temperature: 40 to 80° C. and current density: 1 to 40 A/dm². The thickness of the cobalt plating layer is preferably 0.02 to 0.5 μm and more preferably 0.05 to 0.15 μm. In the second method, if the cobalt plating layer is too thick, there is a risk that the cobalt/nickel ratio in the surface layer is not likely to be decreased in the subsequent heat treatment, and as a result, there is a concerns that the oxide coating film is likely to be increased. In addition, a problem such as seizuring to a metal mold upon forming may occur due to the increase in the grain size.

Next, by performing heat treatment on metal plate 11 having the nickel plating layer and the cobalt plating layer formed thereon, treatment in which the nickel plating layer and the cobalt plating layer are thermally diffused to form nickel-cobalt binary alloy layer 12 is carried out. The heat treatment in this case may be carried out under the same conditions as the above-mentioned first method.

In the second method, by carrying out the treatment for thermal diffusion, not only nickel-cobalt binary alloy layer 12 can be formed, but also oxide coating film 13 can be satisfactorily formed on the surface of nickel-cobalt binary alloy layer 12. Moreover, by carrying out the treatment for thermal diffusion, it is also possible to form an iron-nickel diffusion layer between metal plate 11 and the nickel layer. Accordingly, the configuration can have iron-nickel diffusion layer 15, nickel layer 14, and nickel-cobalt binary alloy layer 12 in this order from the bottom on metal plate 11 (Ni—Co/Ni/Fe—Ni/Fe) as in surface-treated metal plate 1c shown in FIG. 6. Alternatively, in the second method, depending on the thickness of the nickel plating layer or heat treatment conditions, the nickel layer can be thermally diffused completely, and in this case, the configuration can have iron-nickel diffusion layer 15 and nickel-cobalt binary alloy layer 12 in this order from the bottom on metal plate 11 (Ni—Co/Fe—Ni/Fe) as in surface-treated metal plate 1b shown in FIG. 5.

<Oxide Coating Film 13>

In the present embodiment, the above-mentioned nickel-cobalt binary alloy layer 12 mentioned above comprises oxide coating film 13 on the surface thereof. Accordingly, the configuration of surface-treated metal plate 1 according to the present embodiment has nickel-cobalt binary alloy layer 12 comprising oxide coating film 13 on metal plate 11, as shown in FIG. 3.

Figure 7:
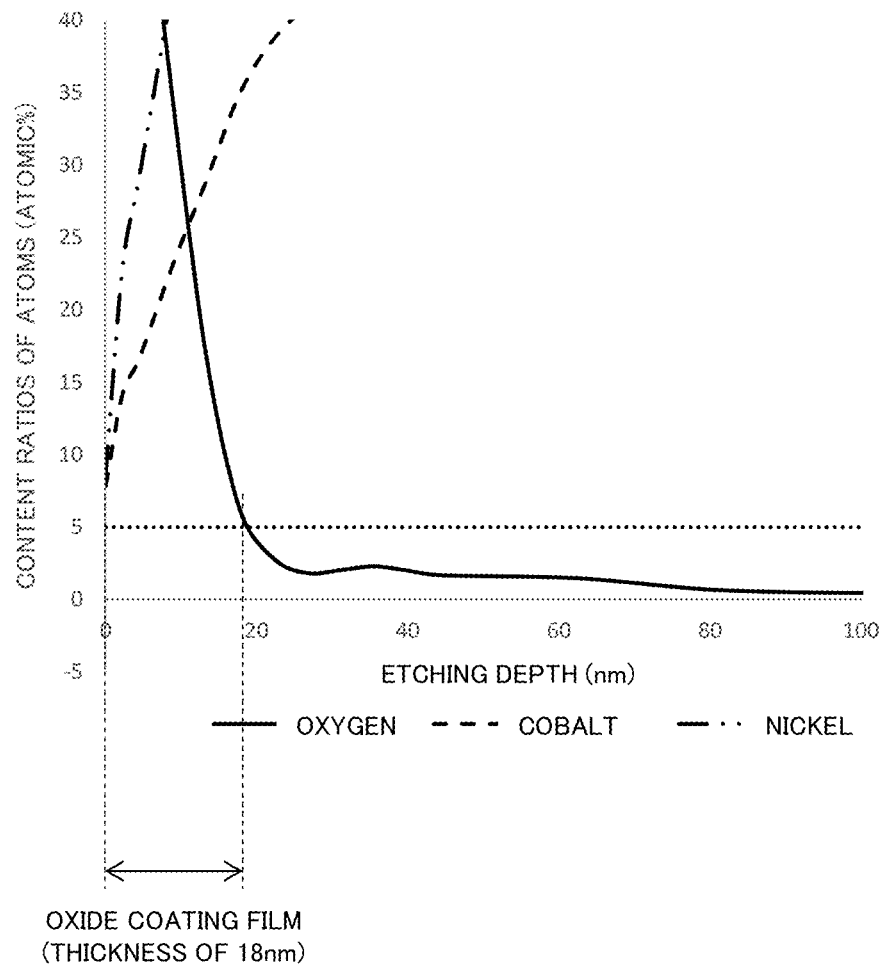
FIG. 7 illustrates an oxide coating film.

Oxide coating film 13 is formed by oxidizing a part of nickel-cobalt binary alloy layer 12, and is a layer including nickel oxides and cobalt oxides. Oxide coating film 13 refers to a part having a content ratio of oxygen atoms of not less than a predetermined value upon measuring the surface of nickel-cobalt binary alloy layer 12 by X-ray photoelectron spectroscopic analysis in the depth direction. In particular, description will be made with reference to the graph in FIG. 7 obtained by measurement of surface-treated metal plate 1 according to Example, which will be mentioned later, by X-ray photoelectron spectroscopic analysis. The graph in FIG. 7 is a graph showing the results of the content ratio of oxygen atoms based on the O1s peak intensity of oxygen atoms, the content ratio of cobalt atoms based on the $Co2p_3$ peak intensity of cobalt atoms, and the content ratio of nickel atoms based on the $Ni2p_3$ peak intensity of nickel atoms, determined for each etching depth (in terms of $SiO_2$) based on measurement results through X-ray photoelectron spectroscopic analysis. In the present embodiment, a part having a content ratio of oxygen atoms of 5 atomic % or more relative to such total amount of oxygen atoms, cobalt atoms and nickel atoms (in the example shown in FIG. 7, a part having an etching depth of 0 to 18 nm) is oxide coating film 13. Therefore, in the example shown in FIG. 7, the thickness of oxide coating film 13 is the thickness of the part having a content ratio of oxygen atoms of 5 atomic % or more, that is, 18 nm.

According to the present embodiment, by making surface-treated metal plate 1 have a thickness of oxide coating film 13 of 0.5 to 30 nm, and by controlling the amount of increase in the thickness of oxide coating film 13 to be 28 nm or less when a pressure cooker test comprising temperature increasing, retention for 72 hours under a water-vapor atmosphere at a temperature of 105° C. and a relative humidity of 100% RH, and temperature decreasing is pertained on surface-treated metal plate 1, discoloration of the surface of surface-treated metal plate 1 can be prevented even if the surface-treated metal plate is stored for a long period of time. In particular, when metal plate 11 to be used has the shape of a strip (for example, a steel strip) and surface-treated metal plate 1 is produced continuously, that produced surface-treated metal plate 1 is wound like a coil at a certain temperature upon the continuous production. Upon this, surface-treated metal plate 1 is wound in a state with moisture involved between plates, and due to this moisture, discoloration or rust is likely to occur. In addition, influence due to seasons is also great, and a similar problem occurs during the summer season, as well as the winter season where dew condensation occurs, presenting a situation where water adheres to the coil. Moreover, when surface-treated metal plate 1 is transported by a vessel, the temperature inboard is high (for example, 50 to 70° C.) and the humidity is also high. If surface-treated metal plate 1 is transported in such a situation for a long period of time (for example, 1 week or longer), the following problem occurs: discoloration or rust proceeds thereon. In contrast, according to surface-treated metal plate 1 of the present embodiment, discoloration in such a situation can be prevented.

Furthermore, according to surface-treated metal plate 1 of the present embodiment, by controlling the thickness of oxide coating film 13 and the amount of increase in the thickness of oxide coating film 13 over the pressure cooker test to be within the above-described ranges, battery characteristics can be improved when surface-treated metal plate 1 is used for battery cases.

The thickness of oxide coating film 13 can be 0.5 to 30 nm, but it is preferably 0.5 to 25 nm and more preferably 0.5 to 20 nm. When the thickness of oxide coating film 13 is in the above-described range, even if surface-treated metal plate 1 to be obtained is stored for a long period of time, it is possible to prevent oxide coating film 13 from further being oxidized excessively during the storage. Due to this, discoloration of the surface of surface-treated metal plate 1 can be prevented, and furthermore, battery characteristics can be improved when surface-treated metal plate 1 is used for battery cases. When the thickness of oxide coating film 13 is too thick, in surface-treated metal plate 1, the surface thereof would be discolored due to an influence of cobalt oxides and the like in oxide coating film 13 if the surface-treated metal plate is stored for a long period of time. Besides, a contact resistance value of the surface is increased, and battery characteristics would be reduced when the surface-treated metal plate is used for battery cases. Note that, when the surface of oxide coating film 13 is discolored (that is, when cobalt or the like in oxide coating film 13 is excessively oxidized and the discoloration proceeds), there may be the cases where the difference in battery characteristics is generated between the discolored part and the undiscolored part if surface-treated metal plate 1 is used for battery cases. In addition, when the surface of oxide coating film 13 is discolored, it is difficult to distinguish that discoloration from those caused by corrosion of metal plate 11, and therefore, there is a risk that it takes time to discover the corrosion of metal plate 11, which is a phenomenon that affects battery characteristics. On the other hand, when the thickness of oxide coating film 13 is too thin, if surface-treated metal plate 1 to be obtained is stored for a long period of time, oxide coating film 13 would further be oxidized excessively during the storage and the surface of surface-treated metal plate 1 would be discolored. Besides, battery characteristics would be reduced when surface-treated metal plate 1 is used for battery cases.

In addition, in oxide coating film 13, the amount of increase in the thickness of oxide coating film 13 can be 28 nm or less, but preferably 25 nm or less and more preferably 20 nm or less over a pressure cooker test comprising temperature increasing, retention for 72 hours under a water-vapor atmosphere at a temperature of 105° C. and a relative humidity of 100% RH, and temperature decreasing. When the amount of increase in the thickness of oxide coating film 13 after the pressure cooker test is controlled to be in the above-described range, even if surface-treated metal plate 1 to be obtained is stored for a long period of time, it is possible to prevent oxide coating film 13 from further being oxidized excessively during the storage. Due to this, discoloration of the surface of surface-treated metal plate 1 can be prevented, and furthermore, battery characteristics can be improved when surface-treated metal plate 1 is used for battery cases. Note that the pressure cooker test can be a test comprising temperature increasing, retention for 72 hours under a water-vapor atmosphere at a temperature of 105° C. and a relative humidity of 100% RH, and temperature decreasing, but it may be a method in which one cycle is defined as "temperature increasing, retention for 24 hours under a water-vapor atmosphere at a temperature of 105° C. and a relative humidity of 100% RH, and temperature decreasing," and this cycle is repeated three times. Even in this case, the amount of increase in the thickness of oxide coating film 13 can be in the above-described range. In addition, in the temperature decreasing step after the retention at 105° C., the temperature can be lowered to 50° C. Moreover, the time for reaching the target temperature in the temperature increasing step and the temperature decreasing step is not particularly limited as long as it is appropriately set in a range not substantially affecting test results. However, for example, it may be set in the range of 30 to 60 minutes for the temperature increasing step and in the range of 45 to 140 minutes for the temperature decreasing step. For example, the temperature increasing step can be 45 minutes and the temperature decreasing step can be 120 minutes.

In the present embodiment, methods of controlling the thickness of oxide coating film 13 of surface-treated metal plate 1 and the amount of increase in the thickness of oxide coating film 13 after the pressure cooker test to be within the above-described respective ranges are not particularly limited, and examples thereof include a method of controlling conditions for the above-mentioned heat treatment after carrying out the nickel-cobalt alloy plating, or, as mentioned later, a method of controlling the content ratio of crystal grains having a crystal grain size of 0.95 μm or more in the surface of surface-treated metal plate 1 (GS1), a method of controlling the content ratio of crystal grains having a crystal grain size of 0.05 μm or more and less than 0.25 μm in the surface of surface-treated metal plate 1 (GS2), a method of controlling the ratio of the number of cobalt atoms to the number of nickel atoms at a predetermined depth from the surface of surface-treated metal plate 1, and the like.

Note that, in surface-treated metal plate 1 according to the present embodiment, the thickness of oxide coating film 13 (the total thickness of oxide coating film 13) is preferably 35 nm or less, more preferably 30 nm or less, and further preferably 25 nm or less after performing the pressure cooker test comprising temperature increasing, retention for 72 hours under a water-vapor atmosphere at a temperature of 105° C. and a relative humidity of 100% RH, and temperature decreasing. When the thickness of the oxide coating film after carrying out the pressure cooker test under the above-described particular conditions is controlled to be in the above-described range, even if surface-treated metal plate 1 to be obtained is stored for a long period of time, it is possible to more effectively prevent oxide coating film 13 from further being oxidized excessively during the storage. Due to this, discoloration of the surface of surface-treated metal plate 1 can be prevented more effectively, and furthermore, battery characteristics can be improved when surface-treated metal plate 1 is used for battery cases. Note that the pressure cooker test can be a test comprising temperature increasing, retention for 72 hours under a water-vapor atmosphere at a temperature of 105° C. and a relative humidity of 100% RH, and temperature decreasing, but it may be a method in which one cycle is defined as "temperature increasing, retention for 24 hours under a water-vapor atmosphere at a temperature of 105° C. and a relative humidity of 100% RH, and temperature decreasing," and this cycle is repeated three times. Even in this case, the thickness of oxide coating film 13 can be in the above-described range.

In addition, in surface-treated metal plate 1 according to the present embodiment, when the crystal grain size is measured by electron backscatter diffraction on the outermost surface of the surface on which nickel-cobalt binary alloy layer 12 comprising oxide coating film 13 is formed, the ratio, by number, of crystal grains having a crystal grain size of 0.95 µm or more to crystal grains having a crystal grain size of 0.05 µm or more (GS1) is preferably 19% or more, more preferably 21% or more, and further preferably 23% or more. Moreover, the upper limit of the ratio, by number, of crystal grains having a crystal grain size of 0.95 µm or more (GS1) is not particularly limited, and it is preferably 65% or less. According to the electron backscatter diffraction, crystal orientations are measured on the outermost surface of the surface on which nickel-cobalt binary alloy layer 12 comprising oxide coating film 13 is formed, and based on the measurement results, the crystal grain size of each crystal grain is measured by considering a region judged to have the same crystal orientation to be one crystal grain and calculating its particle size. In the present embodiment, crystal grains having a crystal grain size of 0.05 µm or more are detected as crystal grains considered to substantially affect various characteristics, and the ratio, by number, of crystal grains having a crystal grain size of 0.95 µm or more to crystal grains having a crystal grain size of 0.05 µm or more (GS1) is set within the above-described range. A method of controlling the ratio, by number, of crystal grains having a crystal grain size of 0.95 µm or more (GS1) to be in the above-described range is not particularly limited, and examples thereof include a method of carrying out plating while stirring the nickel-cobalt alloy plating bath upon carrying out the above-mentioned nickel-cobalt alloy plating, a method of using an anode formed by mixing a nickel pellet and a cobalt pellet and filling the mixture into an anode basket, and the like. In particular, by using a method of carrying out plating while stirring the nickel-cobalt alloy plating bath or a method of using an anode formed by mixing a nickel pellet and a cobalt pellet and filling the mixture into an anode basket, crystal grains having a crystal grain size of 0.95 µm or more, which is a comparatively large crystal grain size, can be grown properly, and due to this, discoloration of the surface of surface-treated metal plate 1 can be prevented more effectively.

In the present embodiment, for surface-treated metal plate 1, even if surface-treated metal plate 1 to be obtained is stored for a long period of time, by controlling the content ratio of crystal grains having a crystal grain size of 0.95 µm or more (GS1) to be in the above-described range, it is possible to more effectively prevent oxide coating film 13 from further being oxidized excessively during the storage. Due to this, discoloration of the surface of surface-treated metal plate 1 can be prevented more effectively, and furthermore, battery characteristics can be improved more when surface-treated metal plate 1 is used for battery cases.

Alternatively, in surface-treated metal plate 1 according to the present embodiment, when the crystal grain size is measured by electron backscatter diffraction on the outermost surface of the surface on which nickel-cobalt binary alloy layer 12 comprising oxide coating film 13 is formed, the ratio, by number, of crystal grains having a crystal grain size of 0.95 µm or more to crystal grains having a crystal grain size of 0.05 µm or more (GS1) is preferably less than 19%, and the ratio, by number, of crystal grains having a crystal grain size of 0.05 µm or more and less than 0.25 µm to crystal grains having a crystal grain size of 0.05 µm or more and less than 1.05 µm (GS2) is preferably 56% or less, more preferably 53% or less, and further preferably 48% or less. Moreover, the lower limit of the ratio, by number, of crystal grains having a crystal grain size of 0.05 µm or more and less than 0.25 µm (GS2) is not particularly limited, and it is preferably 5% or more. In this case as well, similarly as described above, crystal grains having a crystal grain size of 0.05 µm or more are detected as crystal grains considered to substantially affect various characteristics. And even when the ratio, by number, of crystal grains having a comparatively large crystal grain size of 0.95 µm or more (GS1) is less than 19%, if the ratio, by number, of fine crystal grains having a crystal grain size of 0.05 µm or more and less than 0.25 µm to crystal grains excluding crystal grains having a comparatively large crystal grain size of 0.95 µm or more (GS2) is in the above-described range, effects are obtained, which are equivalent to those when the ratio, by number, of crystal grains having a comparatively large crystal grain size of 0.95 µm or more (GS1) is 19% or more. A method of controlling the ratio, by number, of crystal grains having a crystal grain size of 0.05 µm or more and less than 0.25 µm (GS2) to be in the above-described range is not particularly limited, and examples thereof include a method of carrying out plating while stirring the nickel-cobalt alloy plating bath upon carrying out the above-mentioned nickel-cobalt alloy plating, a method of using an anode formed by mixing a nickel pellet and a cobalt pellet and filling the mixture into an anode basket, and the like. In particular, by using a method of carrying out plating while stirring the nickel-cobalt alloy plating bath or a method of using an anode formed by mixing a nickel pellet and a cobalt pellet and filling the mixture into an anode basket, crystal grains can be grown properly, and due to this, the ratio, by number, of fine crystal grains having a crystal grain size of 0.05 µm or more and less than 0.25 µm (GS2) can be reduced by performing heat treatment, and as a result, discoloration of the surface of surface-treated metal plate 1 can be prevented more effectively.

In the present embodiment, for surface-treated metal plate 1, even when the content ratio of crystal grains having a crystal grain size of 0.95 µm or more (GS1) is less than 19%, by controlling the ratio, by number, of crystal grains having a crystal grain size of 0.05 µm or more and less than 0.25 µm (GS2) to be in the above-described range, even if surface-treated metal plate 1 to be obtained is stored for a long period of time, it is possible to more effectively prevent oxide coating film 13 from further being oxidized excessively during the storage. Due to this, discoloration of the surface of surface-treated metal plate 1 can be prevented more effectively, and furthermore, battery characteristics can be improved more when surface-treated metal plate 1 is used for battery cases.

Furthermore, in surface-treated metal plate 1 according to the present embodiment, when a measurement by X-ray photoelectron spectroscopic analysis is carried out on the surface on which nickel-cobalt binary alloy layer 12 comprising oxide coating film 13 is formed, the upper limit of the ratio of the number of cobalt atoms to the number of nickel atoms at an etching depth where the content ratio of oxygen atoms to the total amount of oxygen atoms, cobalt atoms and nickel atoms is 5 atomic % ($Co/Ni_{(5\ atomic\ \%\ of\ oxygen)}$) is preferably 1.9 or less, more preferably 1.6 or less, further preferably 1.3 or less, and particularly preferably 1.0 or less from the viewpoint of being capable of suppressing discoloration more stably. If $Co/Ni_{(5\ atomic\ \%\ of\ oxygen)}$ is too high, the amount of increase in the thickness of the oxide coating film tends to be large and contact resistance is thus likely to be increased, but contact resistance becomes low when $Co/Ni_{(5\ atomic\ \%\ of\ oxygen)}$ is to some extent high in a certain range, and therefore, the lower limit thereof is preferably 0.2 or more, more preferably 0.3 or more, and further preferably 0.4 or more.

In addition, in surface-treated metal plate 1 according to the present embodiment, when a measurement by X-ray photoelectron spectroscopic analysis is carried out on the surface on which nickel-cobalt binary alloy layer 12 comprising oxide coating film 13 is formed, the upper limit of the ratio of the number of cobalt atoms to the number of nickel atoms at a depth further etched from the etching depth where the content ratio of oxygen atoms to the total amount of oxygen atoms, cobalt atoms and nickel atoms is 5 atomic % by an etching depth of 40 nm (a value in terms of $SiO_2$) ($Co/Ni_{(5\ atomic\ \%\ of\ oxygen+40)}$) is preferably 4.0 or less, more preferably 2.7 or less, and further preferably 2.3 or less. The lower limit thereof is preferably 0.2 or more, more preferably 0.3 or more, and further preferably 0.4 or more.

In the present embodiment, even if surface-treated metal plate 1 to be obtained is stored for a long period of time, by controlling $Co/Ni_{(5\ atomic\ \%\ of\ oxygen)}$ and/or $Co/Ni_{(5\ atomic\ \%\ of\ oxygen+40)}$ to be in the above-described ranges, it is possible to more effectively prevent oxide coating film 13 from further being oxidized excessively during the storage. Due to this, discoloration of the surface of surface-treated metal plate 1 can be prevented more effectively, and furthermore, battery characteristics can be improved more when surface-treated metal plate 1 is used for battery cases.

In particular, in the present embodiment, by controlling $Co/Ni_{(5\ atomic\ \%\ of\ oxygen)}$ to be in a particular range (that is, by controlling Co/Ni at the boundary part of oxide coating film 13 in surface-treated metal plate 1 to be in a particular range), and by controlling $Co/Ni_{(5\ atomic\ \%\ of\ oxygen+40)}$ to be in a particular range (that is, by controlling Co/Ni at a position that is deeper than the part where oxide coating film 13 is formed in surface-treated metal plate 1 to be in a particular range), discoloration of the surface of surface-treated metal plate 1 can be prevented more effectively.

In addition, in surface-treated metal plate 1 according to the present embodiment, from the viewpoint of being capable of preventing discoloration of the surface of surface-treated metal plate 1 more effectively, when a measurement by X-ray photoelectron spectroscopic analysis is carried out on the surface on which nickel-cobalt binary alloy layer 12 comprising oxide coating film 13 is formed, the ratio of the number of cobalt atoms to the number of nickel atoms at an etching depth of 8.9 nm (a value in terms of $SiO_2$) ($Co/Ni_{(8.9)}$) is preferably 0.4 to 1.4.

Furthermore, in surface-treated metal plate 1 according to the present embodiment, from the viewpoint of being capable of preventing discoloration of the surface of surface-treated metal plate 1 more effectively, when a measurement by X-ray photoelectron spectroscopic analysis is carried out on the surface on which nickel-cobalt binary alloy layer 12 comprising oxide coating film 13 is formed, the ratio of the number of cobalt atoms to the number of nickel atoms at an etching depth of 40 nm (a value in terms of $SiO_2$) ($Co/Ni_{(40)}$) is preferably 0.5 to 3.2.

In surface-treated metal plate 1 according to the present embodiment, the upper limit of the total amount of cobalt contained in all layers formed on metal plate 11 (that is, the total amount of cobalt contained in nickel-cobalt binary alloy layer 12, oxide coating film 13, and the iron-nickel-cobalt diffusion layer formed as necessary on metal plate 11) is preferably 6.0 $g/m^2$ or less, more preferably 3.5 $g/m^2$ or less, further preferably 2.6 $g/m^2$ or less, and particularly preferably 1.8 $g/m^2$ or less from the viewpoint of being capable of suppressing discoloration more stably. In addition, the lower limit thereof is preferably 0.15 $g/m^2$ or more, more preferably 0.3 $g/m^2$ or more, and further preferably 0.35 $g/m^2$ or more from the viewpoint of being capable of suppressing increase in contact resistance more. By controlling the amount of cobalt to be in the above-described range, even if surface-treated metal plate 1 to be obtained is stored for a long period of time, it is possible to more effectively prevent oxide coating film 13 from further being oxidized excessively during the storage. Due to this, discoloration of the surface of surface-treated metal plate 1 can be prevented more effectively, and furthermore, battery characteristics can be improved more when surface-treated metal plate 1 is used for battery cases.

In surface-treated metal plate 1 according to the present embodiment, the upper limit of the total amount of nickel contained in all layers formed on metal plate 11 (that is, the total amount of cobalt contained in nickel-cobalt binary alloy layer 12, oxide coating film 13, as well as nickel layer 14, iron-nickel diffusion layer 15 and the iron-nickel-cobalt diffusion layer formed as necessary on metal plate 11) is preferably 28.5 $g/m^2$ or less, more preferably 19.5 $g/m^2$ or less, and further preferably 15.0 $g/m^2$ or less from the viewpoint of allowing excellent electric resistance and excellent corrosion resistance. The lower limit thereof is preferably 2.9 $g/m^2$ or more and more preferably 4.7 $g/m^2$ or more from the viewpoint of retaining corrosion resistance for iron, which is the substrate. By controlling the amount of nickel to be in the above-described range, even if surface-treated metal plate 1 to be obtained is stored for a long period of time, it is possible to more effectively prevent oxide coating film 13 from further being oxidized excessively during the storage. Due to this, discoloration of the surface of surface-treated metal plate 1 can be prevented more effectively, and furthermore, battery characteristics can be improved more when surface-treated metal plate 1 is used for battery cases.

<Battery Case>

The surface-treated metal plate according to the present embodiment is, by subjecting it to deep drawing method, drawing and ironing method (DI method), drawing and thin redrawing (DTR method), a processing method in which stretch-forming and ironing are used in combination after drawing, or the like, formed into positive electrode can 21 of alkaline battery 2 shown in FIGS. 1 and 2, battery cases for the other batteries, or the like for use such that nickel-cobalt binary alloy layer 12 comprising oxide coating film 13 becomes the inner surface side of cases.

The battery case according to the present embodiment is formed by using the above-mentioned surface-treated metal plate according to the present embodiment, and thus can improve battery characteristics of batteries. That is, in a conventional surface-treated metal plate, if it has a nickel-cobalt alloy layer on the surface thereof, when the conventional surface-treated metal plate is stored for a long period of time, the surface would be oxidized and cobalt oxides would be formed excessively, thereby discoloring the surface. Besides, a contact resistance value of the surface is increased, and battery characteristics would be reduced when the conventional surface-treated metal plate is used for battery cases. Furthermore, when the discoloration caused by cobalt oxides proceeds, there may be the cases where the difference in battery characteristics is generated between the discolored part and the undiscolored part if that surface-treated metal plate is used for battery cases. In addition, when the discoloration caused by cobalt oxides proceeds, it is difficult to distinguish that discoloration from those caused by corrosion of the metal plate, and therefore, there is a risk that it takes time to discover the corrosion of the metal plate, which is a phenomenon that affects battery characteristics.

In contrast, the battery case according to the present embodiment is formed by using the above-mentioned surface-treated metal plate according to the present embodiment, and therefore, discoloration of the surface can be prevented more effectively and battery characteristics of batteries can be improved.

EXAMPLES

Hereinafter, the present invention will be described more specifically with reference to Examples, but the present invention is not limited to these Examples.

Note that the definition and evaluation method for each characteristic are as follows:

<Amount of Ni and Amount of Co>

The amount of Ni and the amount of Co contained in the nickel-cobalt binary alloy layer including the oxide coating film were determined by measuring the surface of the surface-treated metal plate before performing the pressure cooker test, with an X-ray fluorescence spectrometer (manufactured by Rigaku Corporation, ZSX100e) (sample size: $\varphi$49 mm, measuring diameter: $\varphi$30 mm, X-ray type: Ni—K$\alpha$ radiation and Co—K$\alpha$ radiation).

<Ratio, by Number, of Crystal Grains Having Crystal Grain Size of 0.95 µm or More (GS1) and Ratio, by Number, of Crystal Grains Having Crystal Grain Size of 0.05 µm or More and Less Than 0.25 µm (GS2)>

For the surface-treated metal plate before performing the pressure cooker test, upon irradiating the surface of the surface-treated metal plate with an electron ray using a scanning electron microscope (SEM), an electron back scattering pattern (EBSD (Electron Backscatter Diffraction)) was obtained by projecting the reflected electron ray onto a screen. By analyzing the electron back scattering pattern, crystal grains having a crystal grain size of 0.05 µm or more were detected. Note that, upon the measurement, the measuring range was set as 10 µm by 10 µm, the crystal misorientation (the range of crystal orientation judged to be one crystal grain) was set as 15° or less, and "TSL OEM Data Collection 6 (manufactured by TSL Solutions)" was used as an analytical software. In particular, for crystal grains detected from analytical results to have a crystal grain size of 0.05 µm or more, they were separated into groups for every 0.1 µm from a smaller crystal grain size, such as "the first group composed of crystal grains having a crystal grain size of 0.05 µm or more and less than 0.15 µm", "the second group composed of crystal grains having a crystal grain size of 0.15 µm or more and less than 0.25 µm" and "the third group composed of crystal grains having a crystal grain size of 0.25 µm or more and less than 0.35 µm". Such a grouping was carried out until "the fiftieth group composed of crystal grains having a crystal grain size of 4.95 µm or more and less than 5.05 µm". Then, based on the number of crystal grains that belong to each group, the ratio, by number, of crystal grains having a crystal grain size of 0.95 µm or more to crystal grains having a crystal grain size of 0.05 µm or more (GS1) was determined. More specifically, the ratio, by number, of crystal grains having a crystal grain size of 0.95 µm or more (GS1) was determined from the ratio of the total number in the tenth group (0.95 µm or more and less than 1.05 µm) and the eleventh to fiftieth groups having a grain size larger than this to the total number in all groups.

Furthermore, in the present Examples, for those in which the ratio, by number, of crystal grains having a crystal grain size of 0.95 µm or more (GS1) was less than 19%, based on the number of crystal grains that belong to each group, the ratio, by number, of crystal grains having a crystal grain size of 0.05 µm or more and less than 0.25 µm to crystal grains having a crystal grain size of 0.05 µm or more and less than 1.05 µm (GS2) was also determined. More specifically, the ratio, by number, of crystal grains having a crystal grain size of 0.05 µm or more and less than 0.25 µm (GS2) was determined from the ratio of the total number in the first group and the second group to the total number in the first to ninth groups (for the ninth group, 0.85 µm or more and less than 0.95 µm).

<Thickness of Oxide Coating Film>

By measuring the surface of the surface-treated metal plate using an X-ray photoelectron spectroscopic instrument before and after performing the pressure cooker test, the content ratio of oxygen atoms based on the O1s peak intensity of oxygen atoms, the content ratio of cobalt atoms based on the Co2p$_3$ peak intensity of cobalt atoms, and the content ratio of nickel atoms based on the Ni2p$_3$ peak intensity of nickel atoms were determined for each etching depth (in terms of SiO$_2$). Then, based on the determined results, a depth from the surface of the surface-treated metal plate to a part having a content ratio of oxygen atoms of 5 atomic % or more relative to the total amount of oxygen atoms, cobalt atoms and nickel atoms was detected as the thickness of the oxide coating film. In addition, the difference in the thickness of the oxide coating film of the surface-treated metal plate before and after performing the pressure cooker test was calculated as the amount of increase in the oxide coating film.

<Co/Ni$_{(8.9)}$, Co/Ni$_{(5\ atomic\ \%\ of\ oxygen)}$, CO/Ni$_{(40)}$ and Co/Ni$_{(5\ atomic\ \%\ of\ oxygen+40)}$>

By measuring the surface of the surface-treated metal plate using an X-ray photoelectron spectroscopic instrument before and after performing the pressure cooker test, the content ratio of cobalt atoms based on the Co2p$_3$ peak intensity of cobalt atoms and the content ratio of nickel atoms based on the Ni2p$_3$ peak intensity of nickel atoms were determined for each etching depth (in terms of SiO$_2$). Then, based on the determined results, each of the following was calculated: the ratio of the number of cobalt atoms to the number of nickel atoms at a position with an etching depth of 8.9 nm (Co/Ni$_{(8.9)}$); the ratio of the number of cobalt atoms to the number of nickel atoms at an etching depth where the content ratio of oxygen atoms to the total amount of oxygen atoms, cobalt atoms and nickel atoms is 5 atomic % (Co/Ni$_{(5\ atomic\ \%\ of\ oxygen)}$); the ratio of the number of cobalt atoms to the number of nickel atoms at a position with an etching depth of 40 nm (Co/Ni$_{(40)}$); and the ratio of the number of cobalt atoms to the number of nickel atoms at a depth further etched from the etching depth where the content ratio of oxygen atoms is 5 atomic % by an depth of 40 nm (Co/Ni$_{(5\ atomic\ \%\ of\ oxygen+40)}$).

<Color Tone>

By measuring the surface of the surface-treated metal plate before and after performing the pressure cooker test under conditions of sample size: φ49 mm, measuring diameter: φ30 mm, reflection/transmission: reflection, specular reflection light processing: SCE, and UV conditions: 100% Full, using a spectrophotometer (manufactured by KONICA MINOLTA JAPAN, INC., CM-3500d), the L* values in the L*a*b* color space were measured, and the difference between the L* values of the surface-treated metal plate before and after performing the pressure cooker test was calculated, which was evaluated according to the following criteria:

1: the difference between the L* values was greater than −2.0 and not greater than 0;
2: the difference between the L* values was greater than −2.3 and not greater than −2.0;
3: the difference between the L* values was greater than −8.0 and not greater than −2.3;
4: the difference between the L* values was greater than −20.0 and not greater than −8.0; and
5: the difference between the L* values was not greater than −20.0.

<Contact Resistance Value>

For the surface-treated metal plate before and after performing the pressure cooker test, the contact resistance values of the surface-treated metal plate were obtained by carrying out measurement under conditions of contact load: 100 gf, with an electric contact simulator (manufactured by Yamasaki-Seiki Co., Ltd., CRS-1). In addition, the difference between the contact resistance values of the surface-treated metal plate before and after performing the pressure cooker test was calculated, which was evaluated according to the following criteria:

1: the difference between the contact resistance values was not greater than 6 mΩ;
2: the difference between the contact resistance values was greater than 6 mΩ and not greater than 9 mΩ; and
3: the difference between the contact resistance values was greater than 9 mΩ.

Example 1

As a metal plate, prepared was a steel plate obtained by annealing a TM-rolled sheet (having a thickness of 0.25 mm) made of low-carbon aluminum killed steel having a chemical composition shown below:

C: 0.04% by weight; Mn: 0.21% by weight; Si: 0.02% by weight; P: 0.012% by weight; S: 0.009% by weight; Al: 0.061% by weight; N: 0.0036% by weight; and the balance: Fe and inevitable impurities.

Then, the prepared steel plate was subjected to alkaline electrolytic degreasing and acid pickling of sulfuric acid immersion. Subsequently, nickel plating was carried out under the following conditions, and then, nickel-cobalt alloy plating was carried out under the following conditions to form a nickel-cobalt binary alloy layer having a thickness of 0.2 μm on the nickel plating layer. Note that, upon carrying out the nickel-cobalt alloy plating, the plating was carried out while stirring a plating bath as described below through bubbling. In addition, upon carrying out the nickel-cobalt alloy plating, the anode used was fainted by mixing a nickel pellet and a cobalt pellet and filling the mixture into an anode basket.

Figure 8A:
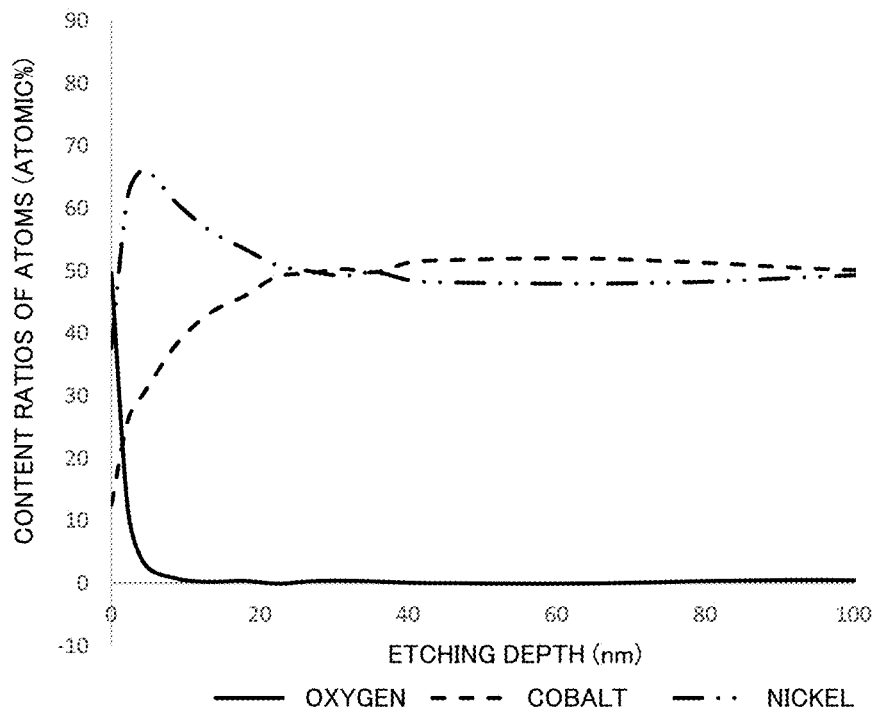
FIGS. 8A and 8B are graphs showing results measured by X-ray photoelectron spectroscopic analysis for a surface-treated metal plate of Example in the state before a pressure cooker test.
Figure 8B:
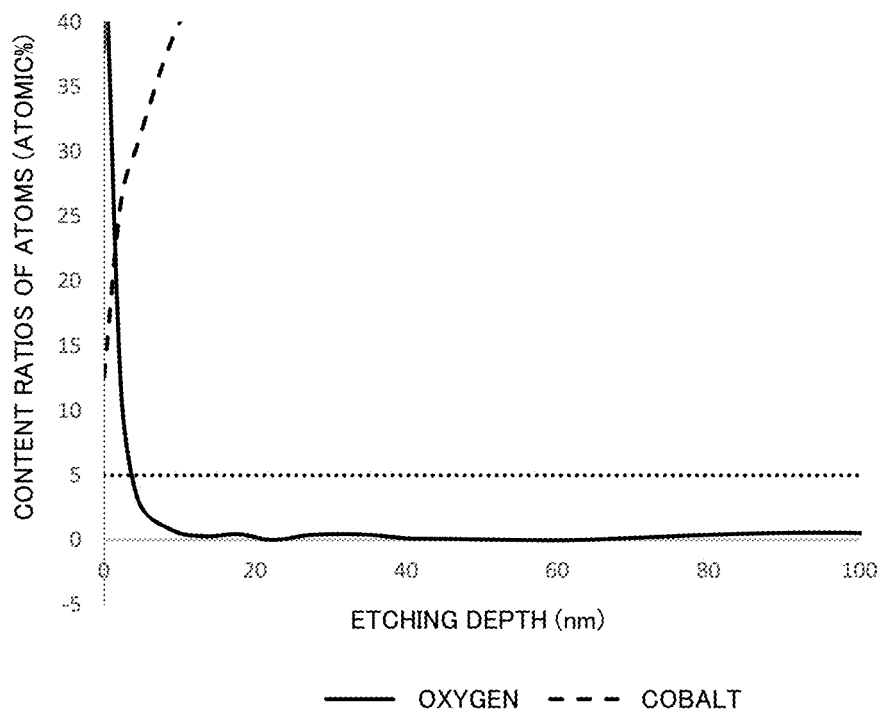
Figure 12A:
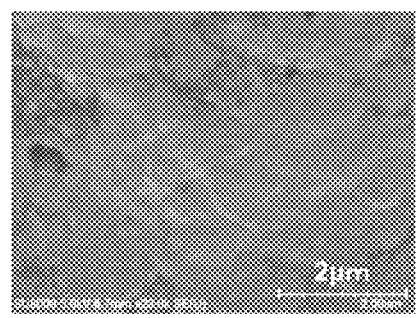
FIGS. 12A and 12B show results measured by SEM and EBSD for a surface-treated metal plate of Example.
Figure 12B:
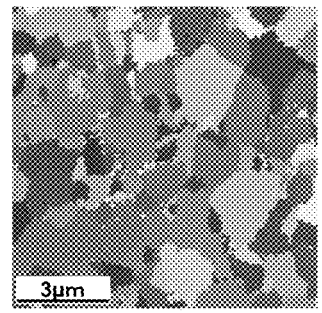

<Nickel Plating>
bath composition: nickel sulfate of 250 g/L, nickel chloride of 45 g/L, and boric acid of 30 g/L
pH: 3.5 to 5.0
bath temperature: 60° C.
current density: 10 A/dm$^2$ <Nickel-Cobalt Alloy Plating>
bath composition of plating bath: containing nickel sulfate, nickel chloride, cobalt sulfate, cobalt chloride and boric acid with a cobalt/nickel molar ratio of 0.30
pH: 3.5 to 5.0
bath temperature: 60° C.
current density: 20 A/dm$^2$ Subsequently, to the steel plate having the nickel-cobalt binary alloy layer famed thereon, continuous annealing (heat treatment) was carried out under conditions of 700° C. and 40 seconds to form an oxide coating film on the nickel-cobalt binary alloy layer, thereby obtaining a surface-treated metal plate. Then, for the surface-treated metal plate thus obtained, according to the above-described methods, carried out were the amount of deposited Ni and the amount of deposited Co; the ratio of crystal grains having a crystal grain size of 1.0 μm or more; the thickness of the oxide coating film; $Co/Ni_{(8.9)}$, $Co/Ni_{(5\ atomic\ \%\ of\ oxygen)}$, $Co/Ni_{(40)}$ and $Co/Ni_{(5\ atomic\ \%\ of\ oxygen+40)}$; the color tone; and the contact resistance value. Results are shown in Table 1. In addition, measurement results by the X-ray photoelectron spectroscopic instrument for determining the thickness of the oxide coating film in Example 1 are shown in FIG. 8A and FIG. 8B. Note that FIG. 8B is a graph obtained by magnifying a part of FIG. 8A. Furthermore, measurement results by SEM for measuring the crystal grain size and analytical results by EBSD in Example 1 are shown in FIG. 12A and FIG. 12B, respectively.

Figure 9A:
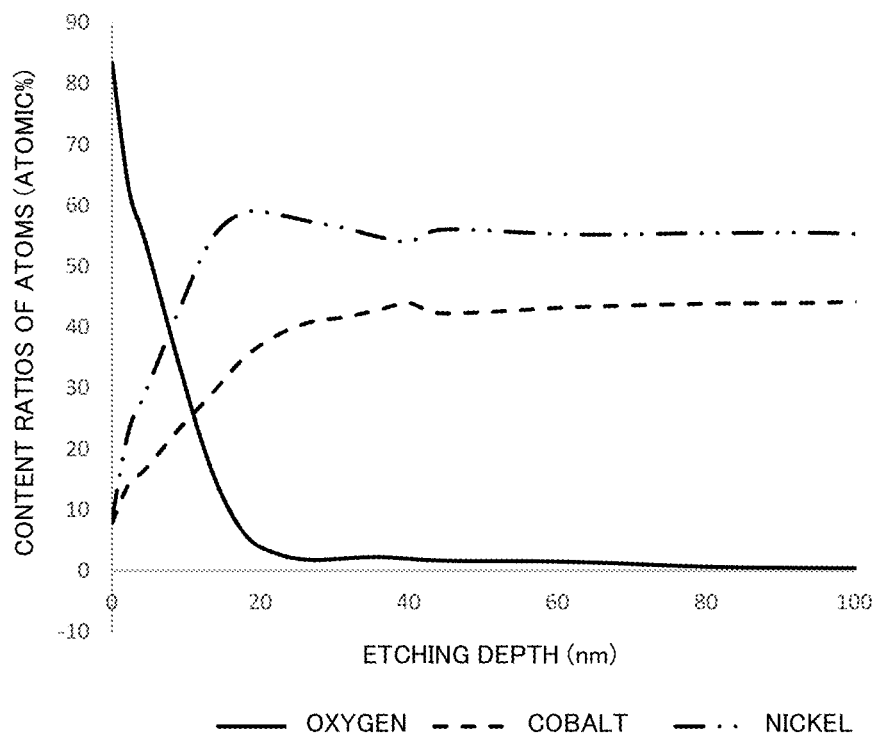
FIGS. 9A and 9B are graphs showing results measured by X-ray photoelectron spectroscopic analysis for a surface-treated metal plate of Example in the state after a pressure cooker test.
Figure 9B:
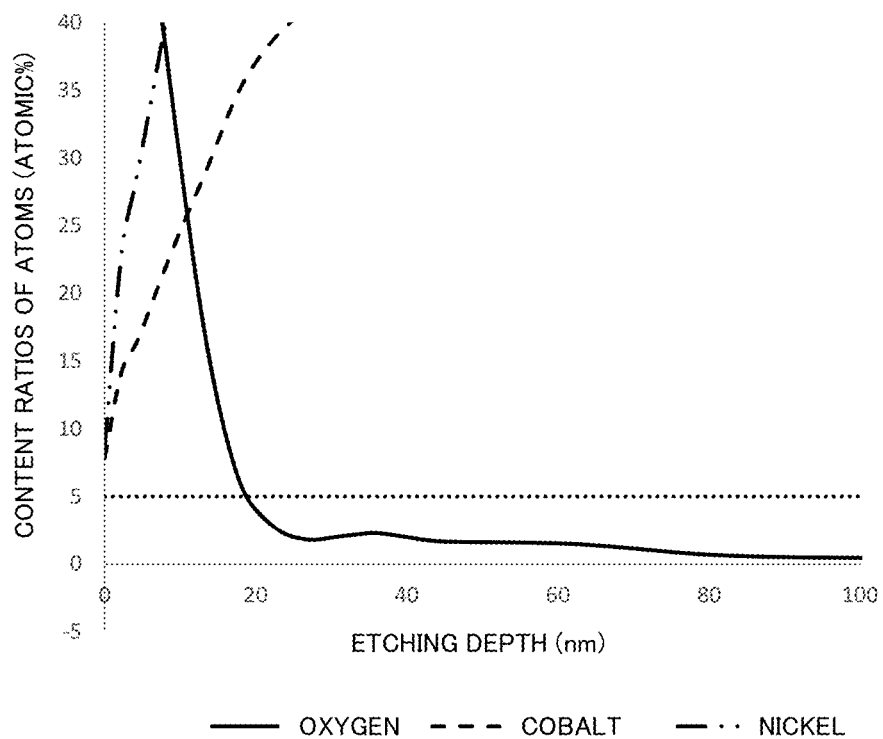

Subsequently, to the surface-treated metal plate, a pressure cooker test was performed using a highly accelerated stress test chamber (manufactured by ESPEC CORP., EHS-411MD) with the surface of the surface-treated metal plate on which nickel-cobalt binary alloy layer 12 and oxide coating film 13 were formed facing upward, substantially under conditions of temperature increasing, retention for 72 hours under a water-vapor atmosphere at a temperature of 105° C. and a relative humidity of 100% RH, and temperature decreasing. (In fact, a cycle carrying out "temperature increasing (temperature increasing time: 45 minutes), retention for 24 hours under a water-vapor atmosphere at a temperature of 105° C. and a relative humidity of 100% RH, and temperature decreasing (temperature decreasing time: 120 minutes)" was repeated 3 times.). Then, for the surface-treated metal plate after the pressure cooker test, carried out were the thickness of the oxide coating film; $Co/Ni_{(5\ atomic\ \%\ of\ oxygen)}$ and $Co/Ni_{(5\ atomic\ \%\ of\ oxygen+40)}$; the color tone; and the contact resistance value. Results are shown in Table 1. In addition, for the surface-treated metal plate after the pressure cooker test, measurement results by the X-ray photoelectron spectroscopic instrument for determining the thickness of the oxide coating film in Example 1 are shown in FIG. 9A and FIG. 9B. Note that FIG. 9B is a graph obtained by magnifying a part of FIG. 9A.

Example 2

Figure 13A:
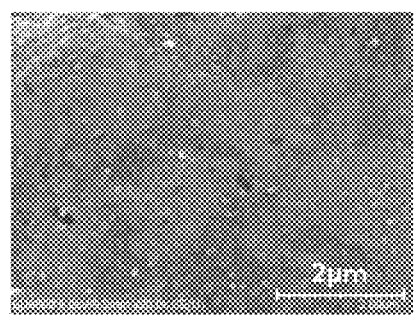
FIGS. 13A and 13B show results measured by SEM and EBSD for a surface-treated metal plate of Example.
Figure 13B:
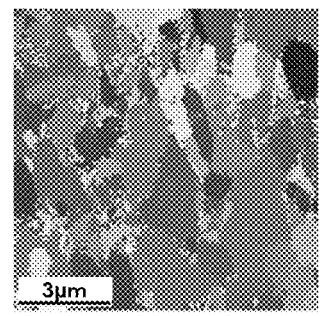

A surface-treated metal plate was made in the same manner as Example 1 except that the conditions for continuous annealing (heat treatment) to the steel plate having the nickel-cobalt binary alloy layer famed thereon were changed to 500° C. and 40 seconds, and evaluations were similarly carried out. Results are shown in Table 1. Furthermore, measurement results by SEM for measuring the crystal grain size and analytical results by EBSD in Example 2 are shown in FIG. 13A and FIG. 13B, respectively.

Example 3

Figure 14:
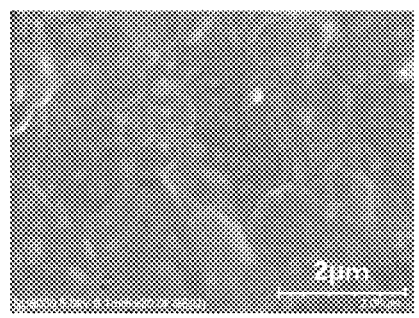
FIG. 14 shows results measured by SEM for a surface-treated metal plate of Example.

A surface-treated metal plate was made in the same manner as Example 1 except that a plating bath having a bath composition with a cobalt/nickel molar ratio of 0.22 was used upon carrying out the nickel-cobalt alloy plating, and evaluations were similarly carried out. Results are shown in Table 1. Furthermore, measurement results by SEM for measuring the crystal grain size in Example 3 are shown in FIG. 14.

Example 4

A surface-treated metal plate was made in the same manner as Example 1 except that a plating bath having a bath composition with a cobalt/nickel molar ratio of 0.49 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 1.

Example 5

A surface-treated metal plate was made in the same manner as Example 1 except that a plating bath having a bath composition with a cobalt/nickel molar ratio of 0.58 was used upon carrying out the nickel-cobalt alloy plating, and evaluations were similarly carried out. Results are shown in Table 1.

Example 6

A surface-treated metal plate was made in the same manner as Example 1 except that a plating bath having a bath composition with a cobalt/nickel molar ratio of 0.20 was used upon carrying out the nickel-cobalt alloy plating, and furthermore, the current density was changed from 20 A/dm$^2$ to 10 A/dm$^2$, and evaluations were similarly carried out. Results are shown in Table 1.

Example 7

A surface-treated metal plate was made in the same manner as Example 1 except that a plating bath having a bath composition with a cobalt/nickel molar ratio of 0.09 was used upon carrying out the nickel-cobalt alloy plating, and evaluations were similarly carried out. Results are shown in Table 1.

Comparative Example 1

Figure 10A:
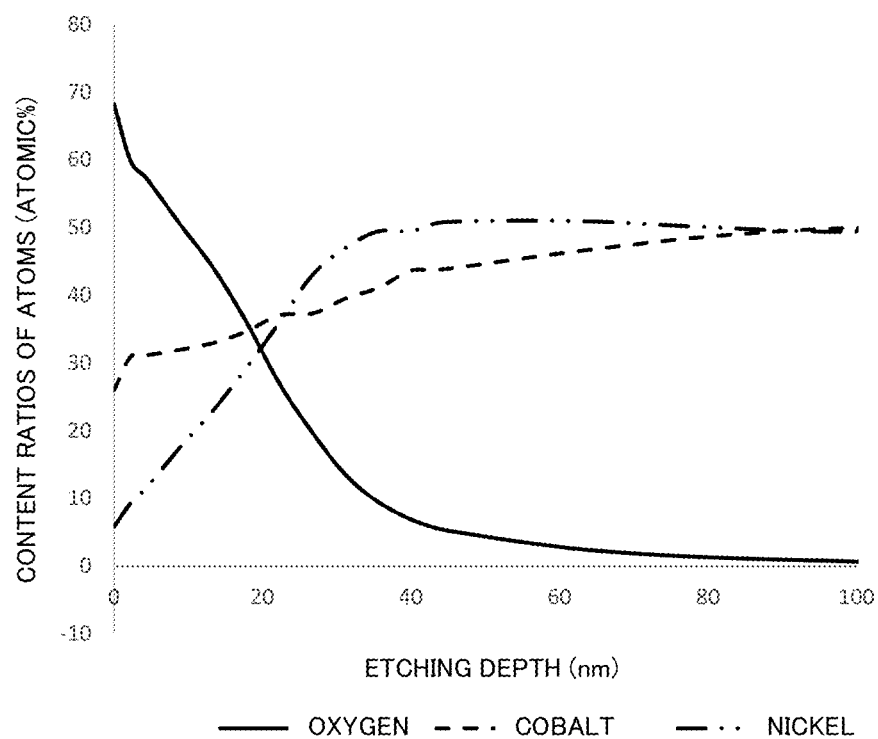
FIGS. 10A and 10B are graphs showing results measured by X-ray photoelectron spectroscopic analysis for a surface-treated metal plate of Example in the state after a pressure cooker test.
Figure 10B:
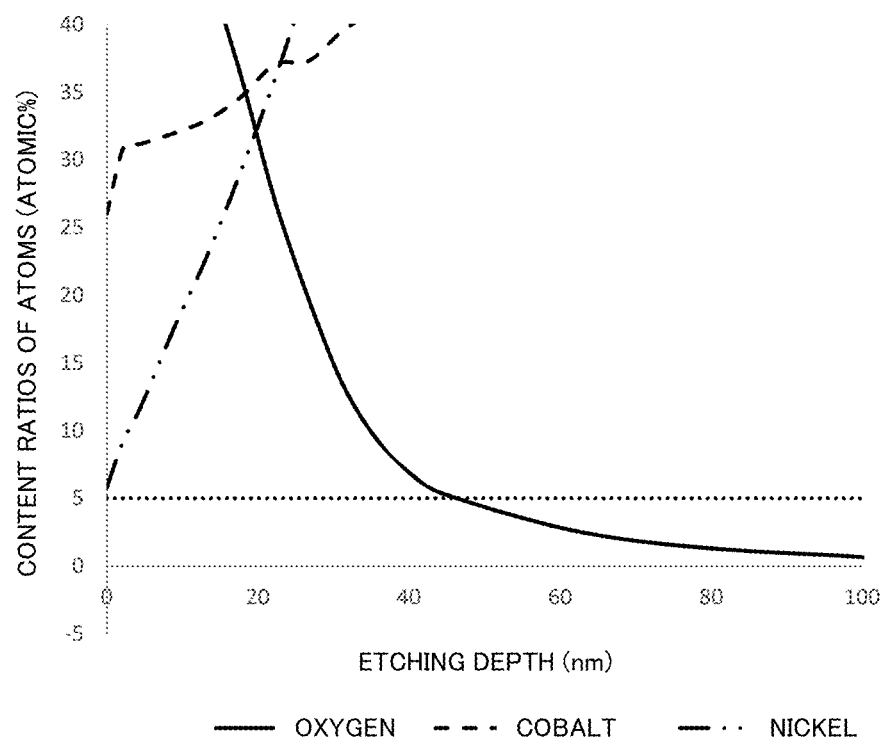
Figure 15A:
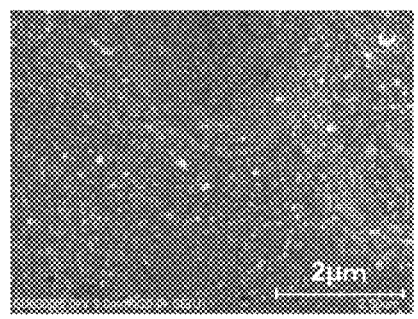
FIGS. 15A and 15B show results measured by SEM and EBSD for a surface-treated metal plate of Comparative Example.
Figure 15B:
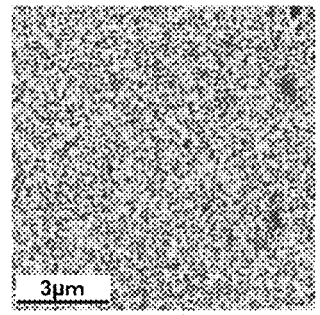

A surface-treated metal plate was made in the same manner as Example 1 except that no continuous annealing (heat treatment) was carried out on the steel plate having the nickel-cobalt binary alloy layer formed thereon, and evaluations were similarly carried out. Results are shown in Table 1. However, in Comparative Example 1, upon measuring the ratio of crystal grains having a crystal grain size of 1.0 μm or more, it was not possible to carry out the measurement sufficiently because the crystal grain size of crystal grains on the surface of the surface-treated metal plate was too small and plating distortion of the nickel-cobalt binary alloy layer was too large. Note that, from the measurement results by SEM on the surface of the surface-treated metal plate according to Comparative Example 1, the surface of the surface-treated metal plate can be confirmed to be covered with very fine primary particles over the entire plating layer, and therefore, it is considered that there is almost no crystal grain having a crystal grain size of 1.0 μm or more on the surface of the surface-treated metal plate. In addition, for the surface-treated metal plate after the pressure cooker test, measurement results by the X-ray photoelectron spectroscopic instrument for determining the thickness of the oxide coating film in Comparative Example 1 are shown in FIG. 10A and FIG. 10B. Note that FIG. 10B is a graph obtained by magnifying a part of FIG. 10A. Furthermore, measurement results by SEM for measuring the crystal grain size and analytical results by EBSD in Comparative Example 1 are shown in FIG. 15A and FIG. 15B, respectively.

Comparative Example 2

Figure 16A:
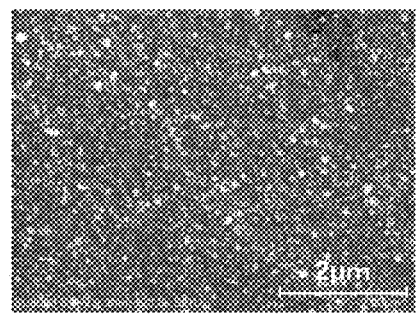
FIGS. 16A and 16B show results measured by SEM and EBSD for a surface-treated metal plate of Comparative Example.
Figure 16B:
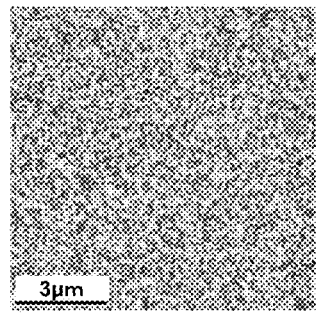

A surface-treated metal plate was made in the same manner as Example 1 except that the conditions for continuous annealing (heat treatment) to the steel plate having the nickel-cobalt binary alloy layer famed thereon were changed to 300° C. and 40 seconds, and evaluations were similarly carried out. Results are shown in Table 1. However, in Comparative Example 2, upon measuring the ratio of crystal grains having a crystal grain size of 1.0 μm or more, it was not possible to carry out the measurement sufficiently because the crystal grain size of crystal grains on the surface of the surface-treated metal plate was too small and plating distortion of the nickel-cobalt binary alloy layer was too large. Note that, from the measurement results by SEM on the surface of the surface-treated metal plate according to Comparative Example 2, the surface of the surface-treated metal plate can be confirmed to be covered with very fine primary particles over the entire plating layer, and therefore, it is considered that there is almost no crystal grain having a crystal grain size of 1.0 μm or more on the surface of the surface-treated metal plate. Furthermore, measurement results by SEM for measuring the crystal grain size and analytical results by EBSD in Comparative Example 2 are shown in FIG. 16A and FIG. 16B, respectively.

Comparative Example 3

A surface-treated metal plate was made in the same manner as Example 1 except that, on the prepared steel plate, no nickel plating was carried out (a nickel plating layer was not formed) and nickel-cobalt alloy plating was directly carried out to form a nickel-cobalt binary alloy layer, and evaluations were similarly carried out. Results are shown in Table 1.

Comparative Example 4

A surface-treated metal plate was made in the same manner as Example 1 except that a plating bath having a bath composition with a cobalt/nickel molar ratio of 0.58 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 1.

Comparative Example 5

Figure 17:
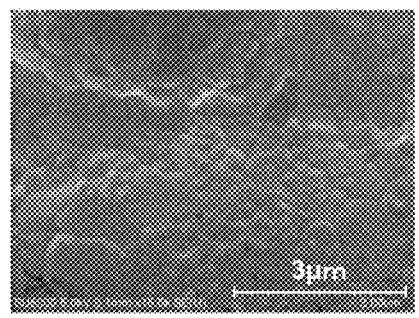
FIG. 17 shows results measured by SEM for a surface-treated metal plate of Comparative Example.

A surface-treated metal plate was made in the same manner as Example 1 except that, instead of the nickel-cobalt alloy plating, cobalt plating was carried out under the following conditions to form a cobalt plating layer having a thickness of 0.1 μm, and subsequently no continuous annealing (heat treatment) was carried out, and evaluations were similarly carried out. Results are shown in Table 1. However, in Comparative Example 5, upon measuring the ratio of crystal grains having a crystal grain size of 1.0 μm or more, it was not possible to carry out the measurement sufficiently because the crystal grain size of crystal grains on the surface of the surface-treated metal plate was too small and plating distortion of the nickel-cobalt binary alloy layer was too large. Note that, from the measurement results by SEM on the surface of the surface-treated metal plate according to Comparative Example 5, the surface of the surface-treated metal plate can be confirmed to be covered with very fine primary particles over the entire plating layer, and therefore, it is considered that there is almost no crystal grain having a crystal grain size of 1.0 μm or more on the surface of the surface-treated metal plate. Measurement results by SEM for measuring the crystal grain size in Comparative Example 5 are shown in FIG. 17.

<Cobalt Plating> bath composition: cobalt sulfate of 250 g/L, cobalt chloride of 90 g/L, sodium chloride of 20 g/L, and boric acid of 30 g/L pH: 3.5 to 5.0 bath temperature: 60° C.

current density: 20 A/dm$^2$

Comparative Example 6

Figure 18:
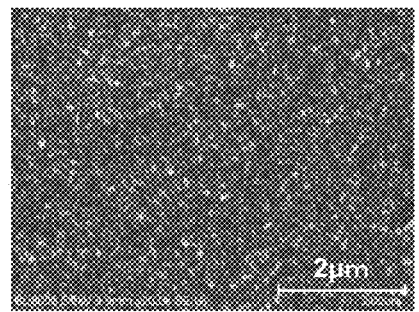
FIG. 18 shows results measured by SEM for a surface-treated metal plate of Comparative Example.

A surface-treated metal plate was made in the same manner as Example 1 except that, instead of the nickel-cobalt alloy plating, cobalt plating was carried out under the same conditions as those in Comparative Example 5 described above to form a cobalt plating layer having a thickness of 0.1 μm, and evaluations were similarly carried out. Results are shown in Table 1. Note that, upon measuring the color tone in Comparative Example 6, the difference in color tone before and after performing the pressure cooker test was comparatively small, but strong discoloration was generated partially on the surface of the surface-treated metal plate, and therefore, the color tone was evaluated as not good (NG). Furthermore, measurement results by SEM for measuring the crystal grain size in Comparative Example 6 are shown in FIG. 18.

TABLE 1

| | Production conditions | | | | Surface-treated metal plate (before pressure cooker test) | | | | |
|---|---|---|---|---|---|---|---|---|---|
| | Presence or absence of nickel plating layer | Co/Ni Molar ratio in nickel-cobalt plating bath | Amount of Ni [g/m$^2$] | Amount of Co [g/m$^2$] | Proportion of crystal grains having particle size of 0.95 μm or more (GS1) [%] | Proportion of crystal grains having particle size of 0.05 μm or more and less than 0.25 μm (GS2) [%] | Thickness of oxide coating film [nm] | Co/Ni$_{(8.9)}$ | Co/Ni$_{(5\ atomic\ \%\ of\ oxygen)}$ |
| Example 1 | Present | 0.30 | 9.73 | 0.85 | 21 | — | 4 | 0.63 | 0.45 |
| Example 2 | Present | 0.30 | 9.65 | 0.88 | 16 | 34 | 3 | 0.71 | 0.60 |
| Example 3 | Present | 0.22 | 9.72 | 0.78 | 24 | — | 5 | 0.50 | 0.44 |
| Example 4 | Present | 0.49 | 9.31 | 1.18 | 18 | 55 | 6 | 1.39 | 1.00 |
| Example 5 | Present | 0.58 | 8.98 | 1.38 | 19 | — | 8 | 1.20 | 1.00 |
| Example 6 | Present | 0.20 | 9.47 | 0.87 | 25 | — | 6 | 0.58 | 0.54 |
| Example 7 | Present | 0.09 | 9.98 | 0.36 | 34 | — | 4 | 0.32 | 0.28 |
| Comparative Example 1 | Present | 0.30 | 9.59 | 0.90 | Unmeasurable | Unmeasurable | 10 | 0.85 | 0.86 |
| Comparative Example 2 | Present | 0.30 | 9.54 | 0.89 | Unmeasurable | Unmeasurable | 10 | 1.49 | 0.75 |
| Comparative Example 3 | Absent | 0.30 | 5.29 | 5.34 | — | — | 22 | 1.59 | 1.85 |
| Comparative Example 4 | Present | 0.58 | 9.08 | 1.37 | 16 | 58 | 6 | 2.32 | 2.00 |
| Comparative Example 5 | Present | Cobalt plating bath was used | 8.28 | 1.87 | Unmeasurable | Unmeasurable | 42 | 815.70 | Unmeasurable |
| Comparative Example 6 | Present | Cobalt plating bath was used | 8.26 | 1.84 | — | — | 6 | 1.09 | 0.88 |

| | Surface-treated metal plate (before pressure cooker test) | | | Surface-treated metal plate (after pressure cooker test) | | | |
|---|---|---|---|---|---|---|---|
| | Co/Ni$_{(40)}$ | Co/Ni$_{(5\ atomic\ \%\ of\ oxygen\ +\ 40)}$ | Contact resistance value [mΩ] | Thickness of oxide coating film [nm] | Amount of increase in oxide coating film [nm] | Co/Ni$_{(5\ atomic\ \%\ of\ oxygen)}$ | Co/Ni$_{(5\ atomic\ \%\ of\ oxygen\ +\ 40)}$ |
| Example 1 | 1.06 | 1.08 | 0.94 | 18 | 14 | 0.61 | 1.11 |
| Example 2 | 0.91 | 0.92 | 0.92 | 20 | 17 | 0.67 | 0.83 |
| Example 3 | 0.75 | 0.76 | 1.01 | 20 | 15 | 0.76 | 0.78 |
| Example 4 | 2.04 | 2.11 | 1.18 | 27 | 21 | 1.54 | 1.80 |

TABLE 1-continued

| | | | | | | | |
|---|---|---|---|---|---|---|---|
| Example 5 | 2.78 | 2.57 | 1.20 | 22 | 14 | 1.51 | 2.62 |
| Example 6 | 1.02 | 1.04 | 1.27 | 19 | 13 | 0.67 | 1.06 |
| Example 7 | 0.41 | 0.41 | 1.05 | 23 | 19 | 0.28 | 0.30 |
| Comparative Example 1 | 0.94 | 0.92 | 0.95 | 46 | 36 | 0.86 | 0.98 |
| Comparative Example 2 | 1.71 | 0.94 | 1.03 | 40 | 30 | 0.73 | 0.94 |
| Comparative Example 3 | 1.76 | 1.88 | 0.85 | 80 | 58 | 1.57 | 1.55 |
| Comparative Example 4 | 3.38 | 3.20 | 1.21 | 38 | 32 | 2.24 | 2.50 |
| Comparative Example 5 | 946.70 | Unmeasured | 1.00 | 300 | 258 | Unmeasured | Unmeasured |
| Comparative Example 6 | 8.78 | 10.76 | 1.16 | 200 | 194 | 46.50 | 47.50 |

| | Evaluations | | | |
|---|---|---|---|---|
| | Surface-treated metal plate (after pressure cooker test) Contact resistance value [mΩ] | Amount of change in color tone [ΔL*] | Color tone evaluation | Amount of change in contact resistance value [mΩ] | Contact resistance value evaluation |
| Example 1 | 5.17 | −1.59 | 1 | 4.23 | 1 |
| Example 2 | 8.95 | −2.15 | 2 | 8.03 | 2 |
| Example 3 | 6.00 | −1.72 | 1 | 4.99 | 1 |
| Example 4 | 10.35 | −2.00 | 2 | 8.49 | 2 |
| Example 5 | 6.47 | −1.36 | 1 | 5.27 | 1 |
| Example 6 | 4.25 | −1.73 | 1 | 2.99 | 1 |
| Example 7 | 3.40 | −2.20 | 2 | 2.35 | 1 |
| Comparative Example 1 | 12.85 | −3.70 | 3 | 11.90 | 3 |
| Comparative Example 2 | 10.07 | −2.78 | 3 | 9.04 | 3 |
| Comparative Example 3 | 3.10 | −2.52 | 3 | 2.25 | 1 |
| Comparative Example 4 | 9.53 | −3.06 | 3 | 8.33 | 2 |
| Comparative Example 5 | 569.00 | −31.18 | 5 | 568.01 | 3 |
| Comparative Example 6 | 13.63 | −2.44 | NG | 12.48 | 3 |

As shown in Table 1, in surface-treated metal plates in which the thickness of the oxide coating film on the nickel-cobalt binary alloy layer before the pressure cooker test is 0.5 to 30 nm and the amount of increase in the thickness of the oxide coating film after the pressure cooker test is 28 nm or less, the color tone evaluation and the contact resistance value evaluation are both excellent. Due to this, they are confirmed to be able to prevent discoloration of the surface thereof even if they are stored for a long period of time, and also confirmed to be able to improve battery characteristics when they are used for battery cases (Examples 1 to 7).

On the other hand, in any cases where the amount of increase in the thickness of the oxide coating film after the pressure cooker test is greater than 28 nm, evaluation results of the color tone are poor (Comparative Examples 1 to 6). In addition, among Comparative Examples 1 to 6, Comparative Examples 1, 2, 5 and 6 also have poor evaluation results of the contact resistance value, and from this, it is considered that the increase in the thickness of the oxide coating film makes the contact resistance value on the surface of the surface-treated metal plate unstable. Especially, in Comparative Example 5, the thickness of the oxide coating film on the nickel-cobalt binary alloy layer before the pressure cooker test is greater than 30 nm, and therefore, both of the evaluation results of the color tone and evaluation results of the contact resistance value are particularly poor.

In addition, as shown in FIG. 11, color tone evaluation was carried out by making surface-treated metal plates with varied amounts of Co contained in the nickel-cobalt binary alloy layer and the oxide coating film. In particular, surface-treated metal plates with varied amounts of Co contained in the nickel-cobalt binary alloy layer and the oxide coating film were made by changing the cobalt/nickel molar ratio in the plating bath upon carrying out the nickel-cobalt alloy plating, and furthermore, by changing temperature conditions during the continuous annealing (heat treatment) to the steel plate having the nickel-cobalt binary alloy layer formed thereon. Then, according to the above-described method, the difference between the L* values of the surface-treated metal plate before and after performing the pressure cooker test was calculated, and evaluation was carried out thereon. Note that, in FIG. 11, for surface-treated metal plates having an amount of Co of 0.38 g/m$^2$ or less when the thickness of the nickel-cobalt binary alloy layer is 0.2 μm, even though the amount of change in color tone was comparatively small, the amount of Co was too small, and therefore, they were judged to have poor battery characteristics when used for battery cases, and no color tone evaluation was carried out. In addition, for the surface-treated metal plate on which strong discoloration was generated partially on the surface thereof, the color tone was evaluated as not good (NG).

As shown in FIG. 11, it is confirmed that the smaller the amount of Co contained in the nickel-cobalt binary alloy layer and the oxide coating film is, or the higher the heat treatment temperature is, the smaller the difference in color tone before and after performing the pressure cooker test becomes and the more satisfactory evaluation results of the color tone become. This indicates that if the amount of Co contained in the nickel-cobalt binary alloy layer and the oxide coating film is smaller, or if the heat treatment temperature is higher, the obtained surface-treated metal plate is likely to have the oxide coating film on the nickel-cobalt binary alloy layer in the above-mentioned thickness, and the amount of increase in the thickness of the oxide coating film after the pressure cooker test is likely to be adjusted to a predetermined value or less. It is considered that, as a result, evaluation results of the color tone become satisfactory.

Furthermore, from the results of FIGS. 12 A and 12B (Example 1), FIGS. 13 A and 13B (Example 2), FIGS. 15 A and 15B (Comparative Example 1) and FIGS. 16 A and 16B (Comparative Example 2), it is confirmed that the surface-treated metal plate without being subjected to heat treatment (FIGS. 15 A and 15B) and the surface-treated metal plate for which the heat treatment temperature was 300° C. (FIGS. 16 A and 16B) had a very small crystal grain size on the surface thereof, whereas the surface-treated metal plate for which the heat treatment temperature was 500° C. (FIGS. 13 A and 13B) and the surface-treated metal plate for which the heat treatment temperature was 700° C. (FIGS. 12 A and 12B) had a larger crystal grain size presumably because crystal grains were recrystallized due to the heat treatment. Particularly, the surface-treated metal plate for which heat treatment at 700° C. was carried out was confirmed to have a much larger crystal grain size.

Example 8

A surface-treated metal plate was made in the same manner as Example 1 except that a plating bath having a bath composition with a cobalt/nickel molar ratio of 0.09 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 2.

Example 9

A surface-treated metal plate was made in the same manner as Example 1 except that a plating bath having a bath composition with a cobalt/nickel molar ratio of 0.18 was used upon carrying out the nickel-cobalt alloy plating, and evaluations were similarly carried out. Results are shown in Table 2.

Example 10

A surface-treated metal plate was made in the same manner as Example 1 except that a plating bath having a bath composition with a cobalt/nickel molar ratio of 0.18 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 2.

Example 11

A surface-treated metal plate was made in the same manner as Example 1 except that a plating bath having a bath composition with a cobalt/nickel molar ratio of 0.22 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 2.

Example 12

A surface-treated metal plate was made in the same manner as Example 1 except that a plating bath having a bath composition with a cobalt/nickel molar ratio of 0.49 was used upon carrying out the nickel-cobalt alloy plating, and evaluations were similarly carried out. Results are shown in Table 2.

Example 13

Figure 19:
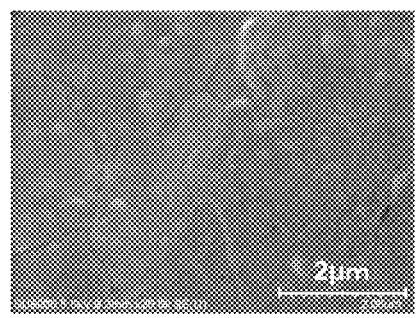
FIG. 19 shows results measured by SEM for a surface-treated metal plate of Comparative Example.

A surface-treated metal plate was made in the same manner as Example 1 except that a plating bath having a bath composition with a cobalt/nickel molar ratio of 0.69 was used upon carrying out the nickel-cobalt alloy plating, and evaluations were similarly carried out. Results are shown in Table 2. Furthermore, measurement results by SEM for measuring the crystal grain size in Example 13 are shown in FIG. 19.

Example 14

A surface-treated metal plate was made in the same manner as Example 1 except that a plating bath having a bath composition with a cobalt/nickel molar ratio of 0.20 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 2.

Comparative Example 7

A surface-treated metal plate was made in the same manner as Example 1 except that a plating bath having a bath composition with a cobalt/nickel molar ratio of 0.49 was used upon carrying out the nickel-cobalt alloy plating, and furthermore, the conditions for continuous annealing (heat treatment) to the steel plate having the nickel-cobalt binary alloy layer formed thereon were changed to 300° C. and 40 seconds, and evaluations were similarly carried out. Results are shown in Table 2.

Comparative Example 8

A surface-treated metal plate was made in the same manner as Example 1 except that a plating bath having a bath composition with a cobalt/nickel molar ratio of 0.58 was used upon carrying out the nickel-cobalt alloy plating, and furthermore, the conditions for continuous annealing (heat treatment) to the steel plate having the nickel-cobalt binary alloy layer formed thereon were changed to 300° C. and 40 seconds, and evaluations were similarly carried out. Results are shown in Table 2.

Comparative Example 9

A surface-treated metal plate was made in the same manner as Example 1 except that a plating bath having a bath composition with a cobalt/nickel molar ratio of 0.69 was used upon carrying out the nickel-cobalt alloy plating, and subsequently no continuous annealing (heat treatment) was carried out on the steel plate having the nickel-cobalt binary alloy layer formed thereon, and evaluations were similarly carried out. Results are shown in Table 2.

Comparative Example 10

A surface-treated metal plate was made in the same manner as Example 1 except that a plating bath having a bath composition with a cobalt/nickel molar ratio of 0.69 was used upon carrying out the nickel-cobalt alloy plating, and furthermore, the conditions for continuous annealing (heat treatment) to the steel plate having the nickel-cobalt binary alloy layer formed thereon were changed to 300° C. and 40 seconds, and evaluations were similarly carried out. Results are shown in Table 2.

Comparative Example 11

A surface-treated metal plate was made in the same manner as Example 1 except that a plating bath having a bath composition with a cobalt/nickel molar ratio of 0.69 was used upon carrying out the nickel-cobalt alloy plating, and furthermore, the conditions for continuous annealing (heat treatment) to the steel plate having the nickel-cobalt binary alloy layer formed thereon were changed to 500° C. and 40 seconds, and evaluations were similarly carried out. Results are shown in Table 2.

Comparative Example 12

A surface-treated metal plate was made in the same manner as Example 1 except that, instead of the nickel-cobalt alloy plating, cobalt plating was carried out under the following conditions below to form a cobalt plating layer having a thickness of 0.1 μm, and furthermore, the conditions for continuous annealing (heat treatment) were changed to 300° C. and 40 seconds, and evaluations were similarly carried out. Results are shown in Table 2.
<Cobalt Plating>
bath composition: cobalt sulfate of 250 g/L, cobalt chloride of 90 g/L, sodium chloride of 20 g/L, and boric acid of 30 g/L
pH: 3.5 to 5.0
bath temperature: 60° C.
current density: 20 A/dm$^2$

TABLE 2

| | Production conditions | | | | | Surface-treated metal plate (before pressure cooker test) | | | |
| --- | --- | --- | --- | --- | --- | --- | --- | --- | --- |
| | Presence or absence of nickel plating layer | Co/Ni Molar ratio in nickel-cobalt plating bath | Heat treatment temperature [° C.] | Amount of Ni [g/m$^2$] | Amount of Co [g/m$^2$] | Proportion of crystal grains having particle size of 0.95 μm or more (GS1) [%] | Proportion of crystal grains having particle size of 0.05 μm or more and less than 0.25 μm (GS2) [%] | Thickness of oxide coating film [nm] | Co/Ni$_{(8.9)}$ |
| Example 8 | Present | 0.09 | 500 | 10.31 | 0.37 | 13 | 50 | 4 | Unmeasured |
| Example 9 | Present | 0.18 | 700 | 9.80 | 0.63 | 27 | — | 4 | Unmeasured |
| Example 10 | Present | 0.18 | 500 | 9.94 | 0.67 | 12 | 44 | 4 | Unmeasured |
| Example 11 | Present | 0.22 | 500 | 9.74 | 0.74 | 13 | 29 | 4 | Unmeasured |
| Example 12 | Present | 0.49 | 700 | 9.17 | 1.16 | 24 | — | 6 | Unmeasured |
| Example 13 | Present | 0.69 | 700 | 8.83 | 1.50 | 20 | — | 6 | Unmeasured |
| Example 14 | Present | 0.20 | 500 | 9.51 | 0.92 | 17 | 32 | 4 | Unmeasured |
| Comparative Example 7 | Present | 0.49 | 300 | 9.32 | 1.18 | Unmeasurable | Unmeasurable | 18 | Unmeasured |
| Comparative Example 8 | Present | 0.58 | 300 | 9.04 | 1.33 | Unmeasurable | Unmeasurable | 28 | Unmeasured |
| Comparative Example 9 | Present | 0.69 | — | 8.90 | 1.52 | Unmeasurable | Unmeasurable | 36 | 3.72 |
| Comparative Example 10 | Present | 0.69 | 300 | 9.00 | 1.49 | Unmeasurable | Unmeasurable | 40 | 3.50 |
| Comparative Example 11 | Present | 0.69 | 500 | 9.04 | 1.54 | 17 | 56 | 6 | Unmeasured |
| Comparative Example 12 | Present | Cobalt plating bath was used | 300 | 8.35 | 1.88 | Unmeasurable | Unmeasurable | 44 | 813.70 |

| | Surface-treated metal plate (before pressure cooker test) | | | | Surface-treated metal plate (after pressure cooker test) | | |
| --- | --- | --- | --- | --- | --- | --- | --- |
| | Co/Ni$_{(5\ atomic\ \%\ of\ oxygen)}$ | Co/Ni$_{(40)}$ | Co/Ni$_{(5\ atomic\ \%\ of\ oxygen\ +\ 40)}$ | Contact resistance value [mΩ] | Thickness of oxide coating film [nm] | Amount of increase in oxide coating film [nm] | Co/Ni$_{(5\ atomic\ \%\ of\ oxygen)}$ |
| Example 8 | 0.25 | Unmeasured | 0.30 | 1.00 | 16 | 12 | 0.23 |
| Example 9 | 0.43 | Unmeasured | 0.76 | 0.99 | 17 | 13 | 0.46 |
| Example 10 | 0.58 | Unmeasured | 0.62 | 0.95 | 16 | 12 | 0.56 |
| Example 11 | 0.60 | Unmeasured | 0.78 | 1.10 | 18 | 14 | 0.61 |
| Example 12 | 1.15 | Unmeasured | 2.15 | 1.01 | 22 | 16 | 1.16 |

TABLE 2-continued

| | | | | | | | |
|---|---|---|---|---|---|---|---|
| Example 13 | 0.71 | Unmeasured | 2.98 | 1.15 | 20 | 14 | 1.59 |
| Example 14 | Unmeasured | Unmeasured | Unmeasured | 1.11 | 18 | 14 | 0.81 |
| Comparative Example 7 | 2.42 | Unmeasured | 2.05 | 1.08 | 72 | 54 | 2.80 |
| Comparative Example 8 | 2.21 | Unmeasured | 2.10 | 1.12 | 100 | 72 | 2.75 |
| Comparative Example 9 | 4.22 | 4.37 | 4.30 | 1.01 | 180 | 144 | 6.20 |
| Comparative Example 10 | 3.80 | 3.86 | 4.21 | 1.07 | 170 | 130 | 4.05 |
| Comparative Example 11 | 3.54 | Unmeasured | 3.80 | 1.08 | 38 | 32 | 3.75 |
| Comparative Example 12 | Unmeasured | 947.40 | Unmeasured | 1.10 | 300 | 256 | Unmeasured |

| | Surface-treated metal plate (after pressure cooker test) | | | | Evaluations | |
|---|---|---|---|---|---|---|
| | $Co/Ni_{(5\ atomic\ \%\ of\ oxygen\ +\ 40)}$ | Contact resistance value [mΩ] | Amount of change in color tone [ΔL*] | Color tone evaluation | Amount of change in contact resistance value [mΩ] | Contact resistance value evaluation |
| Example 8 | 0.28 | 8.88 | −1.61 | 1 | 7.88 | 2 |
| Example 9 | 0.74 | 9.20 | −1.41 | 1 | 8.21 | 2 |
| Example 10 | 0.66 | 9.32 | −1.62 | 1 | 8.37 | 2 |
| Example 11 | 0.81 | 9.97 | −1.71 | 1 | 8.87 | 2 |
| Example 12 | 2.23 | 8.68 | −1.81 | 1 | 7.68 | 2 |
| Example 13 | 3.71 | 6.43 | −1.42 | 1 | 5.29 | 1 |
| Example 14 | 0.92 | 11.03 | −1.83 | 1 | 8.49 | 2 |
| Comparative Example 7 | 2.55 | 14.30 | −4.83 | 3 | 13.22 | 3 |
| Comparative Example 8 | 2.58 | 13.13 | −8.50 | 4 | 12.01 | 3 |
| Comparative Example 9 | 4.60 | 30.53 | −15.85 | 4 | 29.53 | 3 |
| Comparative Example 10 | 4.80 | 15.68 | −10.94 | 4 | 14.61 | 3 |
| Comparative Example 11 | 4.44 | 7.10 | −3.07 | 3 | 6.02 | 2 |
| Comparative Example 12 | Unmeasured | 452.83 | −32.26 | 5 | 451.74 | 3 |

As shown in Table 2, in surface-treated metal plates in which the thickness of the oxide coating film on the nickel-cobalt binary alloy layer before the pressure cooker test is 0.5 to 30 nm and the amount of increase in the thickness of the oxide coating film after the pressure cooker test is 28 nm or less, the color tone evaluation and the contact resistance value evaluation are both excellent. Due to this, they are confirmed to be able to prevent discoloration of the surface thereof even if they are stored for a long period of time, and also confirmed to be able to improve battery characteristics when they are used for battery cases (Examples 8 to 14).

On the other hand, in any cases where the amount of increase in the thickness of the oxide coating film after the pressure cooker test is greater than 28 nm, evaluation results of the color tone are poor (Comparative Examples 7 to 12). Furthermore, Comparative Examples 7 to 10 and 12 also have poor evaluation results of the contact resistance value. Especially, in Comparative Examples 9, 10 and 12, the thickness of the oxide coating film on the nickel-cobalt binary alloy layer before the pressure cooker test is greater than 30 nm, and therefore, both of the evaluation results of the color tone and evaluation results of the contact resistance value are particularly poor.

The invention claimed is:

1. A surface-treated metal plate comprising:
   a metal plate; and
   a nickel-cobalt binary alloy layer formed on the metal plate,
   wherein when a part having a content ratio of oxygen atoms of 5 atomic % or more as measured by X-ray photoelectron spectroscopic analysis is an oxide coating film, the nickel-cobalt binary alloy layer comprises the oxide coating film on a surface thereof, a thickness of the oxide coating film being 0.5 to 30 nm,
   when a measurement by X-ray photoelectron spectroscopic analysis is carried out on a surface on which the nickel-cobalt binary alloy layer comprising the oxide coating film is formed, a ratio of a number of cobalt atoms to a number of nickel atoms at an etching depth where the content ratio of oxygen atoms is 5% atomic ($Co/Ni_{(5\ atomic\ \%\ of\ oxygen)}$) is 0.3 to 1.9, and
   when a pressure cooker test comprising temperature increasing in 30 to 60 minutes from room temperature to 105° C., retention for 72 hours under a water-vapor atmosphere at a temperature of 105° C. and a relative humidity of 100% RH, and temperature decreasing in 45 to 140 minutes from 105° C. to 50° C. is performed, an amount of increase in the thickness of the oxide coating film is 28 nm or less.

2. The surface-treated metal plate according to claim 1, wherein when a crystal grain size is measured by electron backscatter diffraction on a surface of the oxide coating film, a ratio, by number, which is GS1 of crystal grains having a crystal grain size of 0.95 μm or more to crystal grains having a crystal grain size of 0.05 μm or more (GS1) is 19% or more.

3. The surface-treated metal plate according to claim 1, wherein when a crystal grain size is measured by electron backscatter diffraction on a surface of the oxide coating film, a ratio, by number, of crystal grains having a crystal grain size of 0.95 μm or more to crystal grains having a crystal grain size of 0.05 μm or more (GS1) is less than 19%, and a ratio, by number, of crystal grains having a crystal grain size of 0.05 μm or more and less than 0.25 μm to crystal grains having a crystal grain size of 0.05 μm or more and less than 1.05 μm (GS2) is 56% or less.

4. The surface-treated metal plate according to claim 1, wherein when a measurement by X-ray photoelectron spectroscopic analysis is carried out on the nickel-cobalt binary alloy layer, a ratio of a number of cobalt atoms to a number of nickel atoms at an etching depth in terms of $SiO_2$ of 40 nm ($Co/Ni_{(40)}$) is 0.5 to 3.2.

5. The surface-treated metal plate according to claim 1, wherein the thickness of the oxide coating film is 35 nm or less after carrying out the pressure cooker test comprising temperature increasing in 30 to 60 minutes from room temperature to 105° C., retention for 72 hours under a water-vapor atmosphere at a temperature of 105° C. and a relative humidity of 100% RH, and temperature decreasing in 45 to 140 minutes from 105° C. to 50° C.

6. The surface-treated metal plate according to claim 1, wherein an amount of cobalt contained in the nickel-cobalt binary alloy layer comprising the oxide coating film is 0.15 to 6.0 g/m².

7. The surface-treated metal plate according to claim 1, further comprising a nickel plating layer as an undercoating of the nickel-cobalt binary alloy layer.

8. The surface-treated metal plate according to claim 7, wherein a total amount of nickel contained in the nickel-cobalt binary alloy layer and the nickel plating layer is 2.9 to 28.5 g/m².

9. The surface-treated metal plate according to claim 1, wherein the metal plate is a steel plate, and the surface-treated metal plate further comprises an iron-nickel diffusion layer formed directly on the steel plate.

10. A battery case comprising the surface-treated metal plate according to claim 1.

11. A battery comprising the battery case according to claim 10.

12. The surface-treated metal plate according to claim 7, wherein the metal plate is a steel plate, and the surface-treated metal plate further comprises an iron-nickel diffusion layer formed directly on the steel plate.

13. The surface-treated metal plate according to claim 1, wherein when a measurement by X-ray photoelectron spectroscopic analysis is carried out on the nickel-cobalt binary alloy layer, a ratio of a number of cobalt atoms to a number of nickel atoms ($Co/Ni_{(5\ atomic\ \%\ of\ oxygen+40)}$) where an etching depth in terms of $SiO_2$ of 40 nm from where the content ratio of oxygen atoms is 5 atomic % is 0.2 to 4.0.

\* \* \* \* \*